United States Patent [19]
Fukushima et al.

[11] Patent Number: 6,079,317
[45] Date of Patent: Jun. 27, 2000

[54] BEVERAGE EXTRACTION APPARATUS

[75] Inventors: Naoto Fukushima, Gunma-Ken; Yukihide Mochida; Kazuhiro Uehara, both of Saitama-Ken, all of Japan

[73] Assignee: Sanyo Electric Co., Ltd., Osaka-Fu, Japan

[21] Appl. No.: 09/210,840

[22] Filed: Dec. 15, 1998

[51] Int. Cl.[7] .................................................. A47J 31/32
[52] U.S. Cl. .............................. 99/302 R; 99/287; 99/280
[58] Field of Search .............................. 99/302 P, 302 R, 99/280, 287, 297

[56] References Cited

U.S. PATENT DOCUMENTS

| | | | |
|---|---|---|---|
| 5,127,317 | 7/1992 | Takayanagi et al. | 99/302 R X |
| 5,937,738 | 8/1999 | Okamura et al. | 99/302 R |

FOREIGN PATENT DOCUMENTS

| | | |
|---|---|---|
| 4-188396 | 7/1992 | Japan . |
| 6-7250 | 1/1994 | Japan . |
| 10-137123 | 5/1998 | Japan . |

OTHER PUBLICATIONS

Patent Abstracts of Japan, vol. 98, No. 10, Aug. 31, 1998.
Patent Abstracts of Japan, vol. 18, No. 204 (C–1189), Apr. 11, 1994.
Patent Abstracts of Japan, vol. 16, No. 514 (P–1442), Oct. 22, 1992.

*Primary Examiner*—Reginald L. Alexander
*Attorney, Agent, or Firm*—Sughrue, Mion, Zinn, Macpeak & Seas, PLLC

[57] ABSTRACT

A diffuser is provided on a beverage supply tube having a beverage supply valve. Air bubbles formed in the beverage in the final stage of filtration for extraction are removed from the beverage, and only the gas is passed through the beverage supply tube, whereby the tube is air-blown. Thereafter, the beverage remaining in the diffuser is drained through a drain tube. A pair of electrodes are provided on the beverage supply tube which leads the extracted beverage to the serving cup portion, in order to detect the presence and absence of the beverage based on the conduction caused by the beverage between the electrodes. An air pipe for supplying air to the extraction chamber from an air pump is provided with a branch, and a pressure sensor for detecting the pressure within the extraction chamber during the filtration is attached to the branch. The on/off duty ratio of the air pump is controlled based on a pressure signal from the pressure sensor, so as to control the pressure within the extraction chamber below a predetermined pressure.

5 Claims, 39 Drawing Sheets

100 BEVERAGE EXTRACTION APPARATUS
101 CYLINDER
101a INLET
101b MIXING CHAMBER
101c OUTLET
101d EXTRACTION CHAMBER
101e CONDUIT
102 FILTER
103 RUBBER SEAL

104 BEVERAGE RECEIVER
105 BEVERAGE SUPPLY TUBE
106 CAM SYSTEM
106a PRESSURE PLATE
106b CAM
107 VALVE
108 AIR PUMP
109 AIR PIPE

100 BEVERAGE EXTRACTION APPARATUS
101 CYLINDER
101a INLET
101b MIXING CHAMBER
101c OUTLET
101d EXTRACTION CHAMBER
101e CONDUIT
102 FILTER
103 RUBBER SEAL
104 BEVERAGE RECEIVER
105 BEVERAGE SUPPLY TUBE
106 CAM SYSTEM
106a PRESSURE PLATE
106b CAM
107 VALVE
108 AIR PUMP
109 AIR PIPE

FIG.4

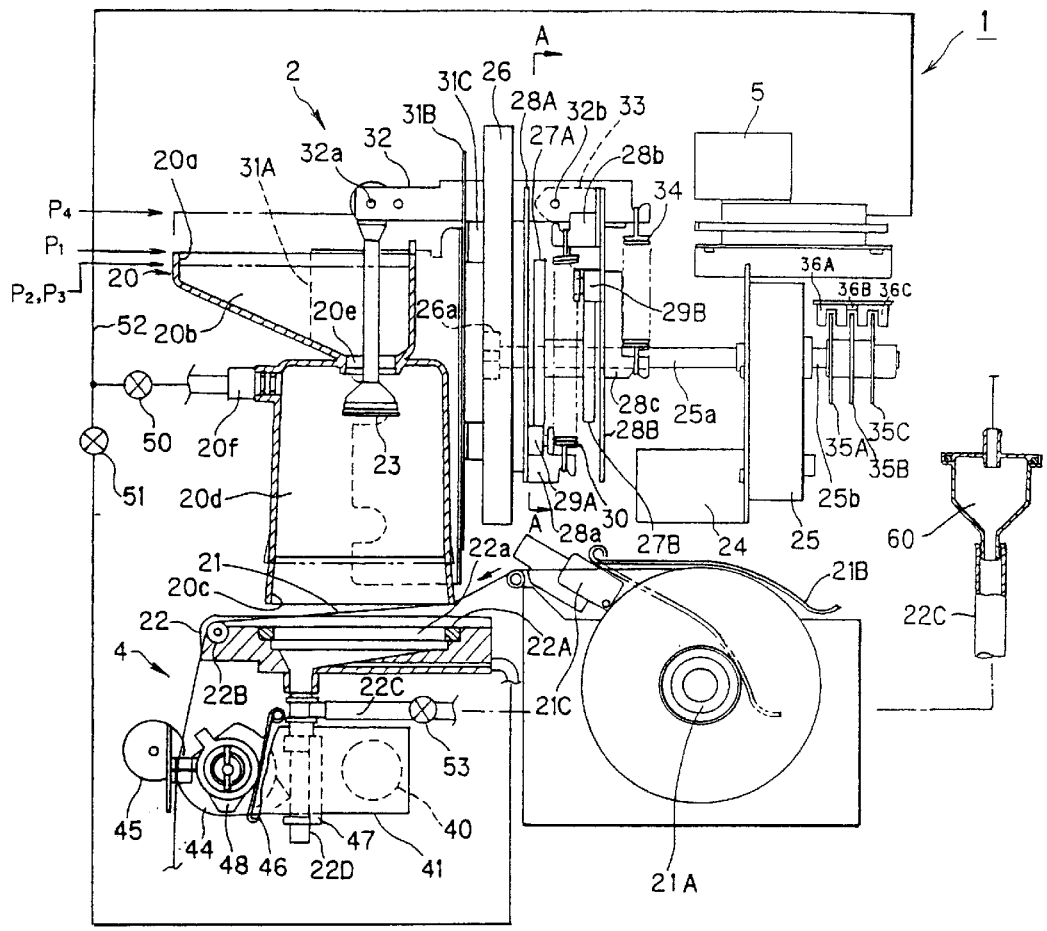

| | | |
|---|---|---|
| 1 BEVERAGE EXTRACTION APPARATUS | 26 SUPPORTING PLATE | 40 WASTE PROCESSING MOTOR |
| 2 EXTRACTION UNIT | 26a BEARING | 41 REDUCING UNIT |
| 3 AIR PUMP | 27A CYLINDER CAM | 41a OUTPUT AXIS |
| 4 WASTE DISPOSAL UNIT | 27B VALVE CAM | 42A DRAIN TUBE OPENING DETECTION PLATE |
| 5 AIR PUMP | 28A CYLINDER DRIVING PLATE | 42B DRAIN TUBE CLOSING DETECTION PLATE |
| 6 CONTROL UNIT | 28B VALVE DRIVING PLATE | 42a PROTRUSION |
| 7 MAIN CONTROL UNIT | 29A CYLINDER CAM FOLLOWER | 43A DRAIN TUBE OPENING DETECTION SENSOR |
| 20 CYLINDER | 29B VALVE CAM FOLLOWER | 43B DRAIN TUBE CLOSING DETECTION SENSOR |
| 20a INLET | 30 DRAWING COIL SPRING | |
| 20b MIXING CHAMBER | 31A, 31B, 31C CONNECTION MEMBER | 44 FILTER SUPPLY ROLLER |
| 20d EXTRACTION CHAMBER | 32 LEVER | 45 GUIDE ROLLER |
| 20e CONDUIT | 32a PIN | 46 PRESSURE PLATE |
| 20f INLET | 33 CONNECTING MEMBER | 46a SUPPORTING AXIS |
| 20g TROUGH | 34 DRAWING COIL SPRING | 47 STATIONARY PLATE |
| 20h DRAIN | 35a PROTRUSION | 48 PRESSING CAM |
| 20i DRAIN TUBE | 35b PROTRUSION | 48a PROTRUSION |
| 21 PAPER FILTER | 35c PROTRUSION | 50 UPPER AIR VALVE |
| 21B FILTER AMOUNT DETECTING LEVER | 35A FIRST PROCESS REGULATION PLATE | 51 LOWER AIR VALVE |
| 21C FILTER EMPTINESS DETECTING SENSOR | 35B SECOND PROCESS REGULATION PLATE | 52 AIR PIPE |
| 22 BEVERAGE RECEIVER | 35C THIRD PROCESS REGULATION PLATE | 53 BEVERAGE SUPPLY VALVE |
| 22a OPENING | 36A FIRST PROCESS REGULATION SENSOR | 54 T-SHAPED BRANCH |
| 22c BEVERAGE SUPPLY TUBE | 36B SECOND PROCESS REGULATION SENSOR | 55 AIR DISCHARGE VALVE |
| 22A RUBBER SEAL | 36C THIRD PROCESS REGULATION SENSOR | 60 DIFFUSER |
| 22B ROLLER | | |
| 22C BEVERAGE SUPPLY TUBE | | |
| 22D DRAIN TUBE | | |
| 23 VALVE | | |
| 24 EXTRACTION MOTOR | | |
| 25 REDUCTION UNIT | | |
| 25a OUTPUT AXIS | | |
| 25b OUTPUT AXIS | | |
| 25c KEY | | |

25a OUTPUT AXIS
25c KEY
27A CYLINDER CAM
27B VALVE CAM
29A CYLINDER CAM FOLLOWER
28B VALVE CAM FOLLOWER

24 EXTRACTION MOTOR
25 REDUCTION UNIT
25a OUTPUT AXIS
25b OUTPUT AXIS
35a PROTRUSION
35b PROTRUSION
35c PROTRUSION

35A FIRST PROCESS REGULATION PLATE
35B SECOND PROCESS REGULATION PLATE
35C THIRD PROCESS REGULATION PLATE
36A FIRST PROCESS REGULATION SENSOR
36B SECOND PROCESS REGULATION SENSOR
36C THIRD PROCESS REGULATION SENSOR

40 WASTE PROCESSING MOTOR
41 REDUCING UNIT
41a OUTPUT AXIS
42A DRAIN TUBE OPENING DETECTION PLATE
42B DRAIN TUBE CLOSING DETECTION PLATE
42a PROTRUSION
43A DRAIN TUBE OPENING DETECTION SENSOR
43B DRAIN TUBE CLOSING DETECTION SENSOR
44 FILTER SUPPLY ROLLER
45 GUIDE ROLLER
46 PRESSURE PLATE
46a SUPPORTING AXIS
47 STATIONARY PLATE
48 PRESSING CAM
48a PROTRUSION

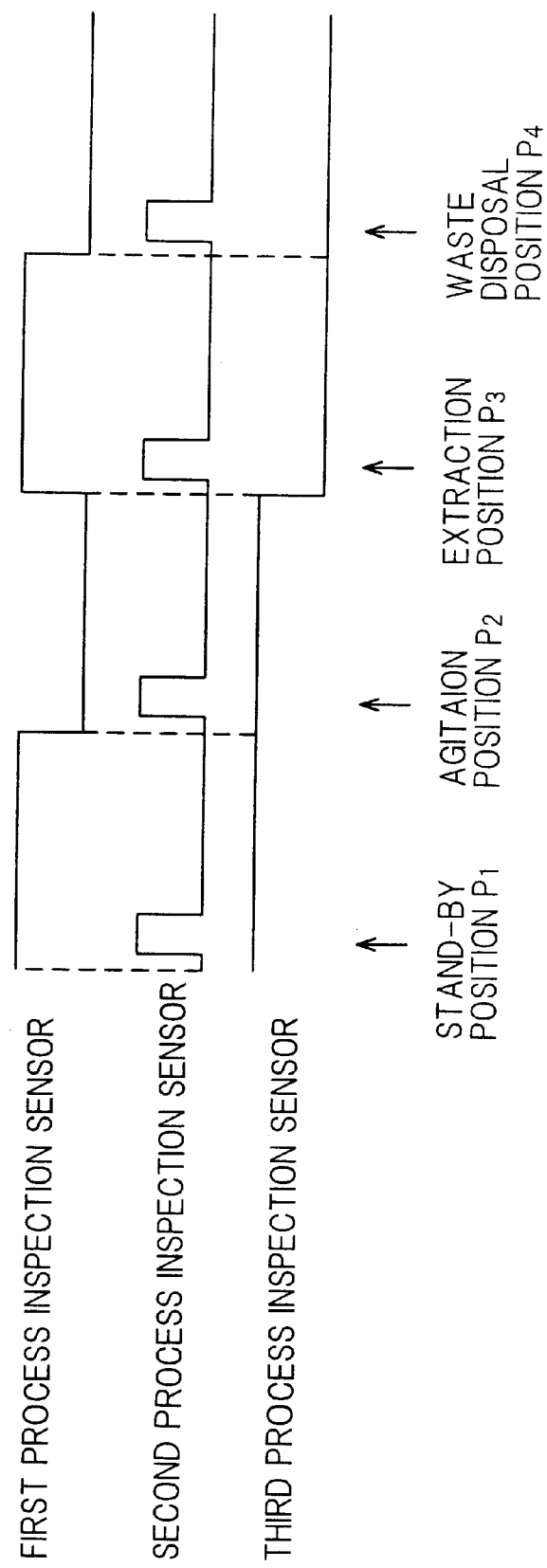

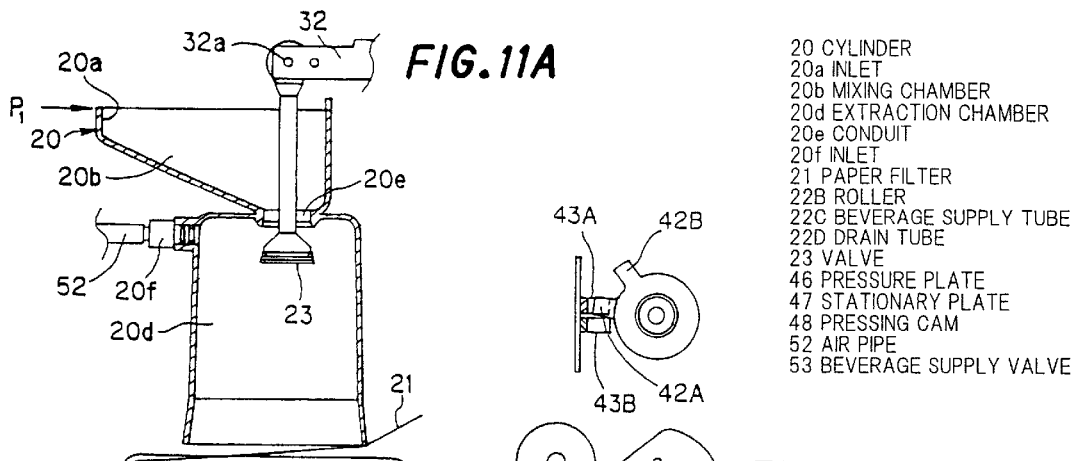

FIG.11A

20 CYLINDER
20a INLET
20b MIXING CHAMBER
20d EXTRACTION CHAMBER
20e CONDUIT
20f INLET
21 PAPER FILTER
22B ROLLER
22C BEVERAGE SUPPLY TUBE
22D DRAIN TUBE
23 VALVE
46 PRESSURE PLATE
47 STATIONARY PLATE
48 PRESSING CAM
52 AIR PIPE
53 BEVERAGE SUPPLY VALVE

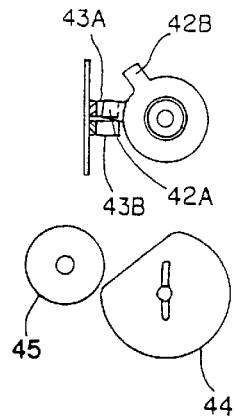

FIG.11B

42A DRAIN TUBE OPENING DETECTION PLATE
42B DRAIN TUBE CLOSING DETECTION PLATE
43A DRAIN TUBE OPENING DETECTION SENSOR
43B DRAIN TUBE CLOSING DETECTION SENSOR
44 FILTER SUPPLY ROLLER
45 GUIDE ROLLER

FIG.11C

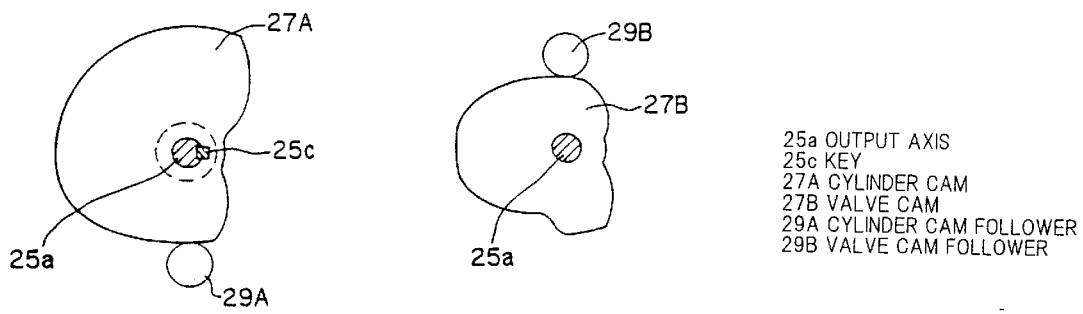

25a OUTPUT AXIS
25c KEY
27A CYLINDER CAM
27B VALVE CAM
29A CYLINDER CAM FOLLOWER
29B VALVE CAM FOLLOWER

FIG.11D

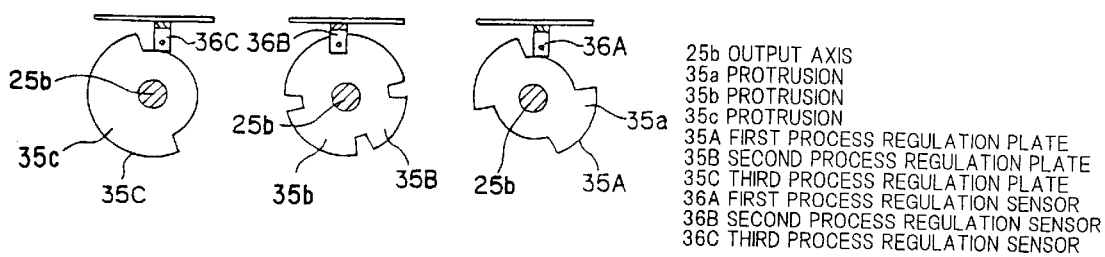

25b OUTPUT AXIS
35a PROTRUSION
35b PROTRUSION
35c PROTRUSION
35A FIRST PROCESS REGULATION PLATE
35B SECOND PROCESS REGULATION PLATE
35C THIRD PROCESS REGULATION PLATE
36A FIRST PROCESS REGULATION SENSOR
36B SECOND PROCESS REGULATION SENSOR
36C THIRD PROCESS REGULATION SENSOR

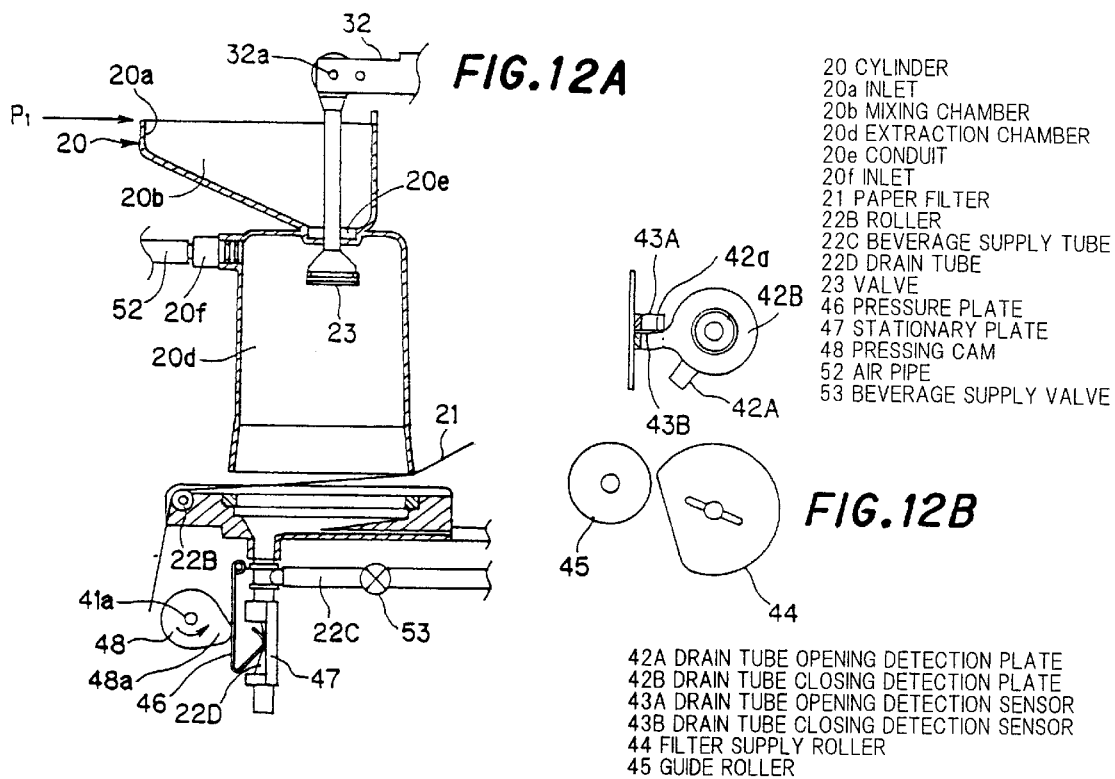

FIG.12A

- 20 CYLINDER
- 20a INLET
- 20b MIXING CHAMBER
- 20d EXTRACTION CHAMBER
- 20e CONDUIT
- 20f INLET
- 21 PAPER FILTER
- 22B ROLLER
- 22C BEVERAGE SUPPLY TUBE
- 22D DRAIN TUBE
- 23 VALVE
- 46 PRESSURE PLATE
- 47 STATIONARY PLATE
- 48 PRESSING CAM
- 52 AIR PIPE
- 53 BEVERAGE SUPPLY VALVE

FIG.12B

- 42A DRAIN TUBE OPENING DETECTION PLATE
- 42B DRAIN TUBE CLOSING DETECTION PLATE
- 43A DRAIN TUBE OPENING DETECTION SENSOR
- 43B DRAIN TUBE CLOSING DETECTION SENSOR
- 44 FILTER SUPPLY ROLLER
- 45 GUIDE ROLLER

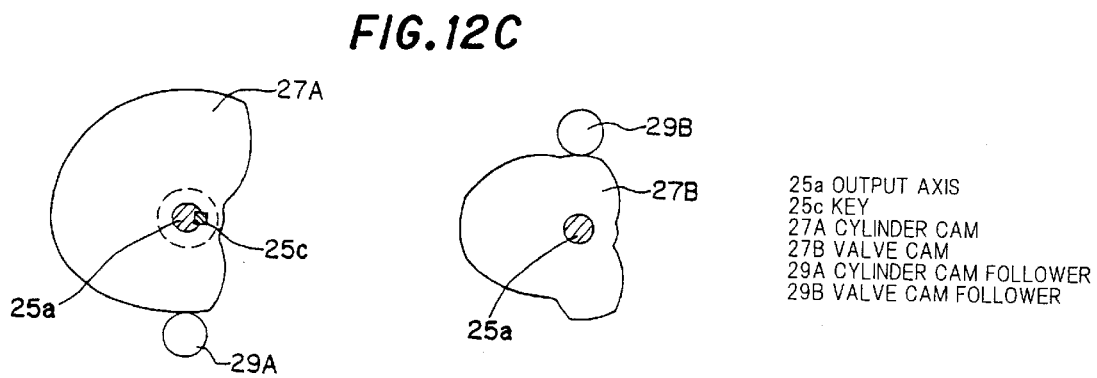

FIG.12C

- 25a OUTPUT AXIS
- 25c KEY
- 27A CYLINDER CAM
- 27B VALVE CAM
- 29A CYLINDER CAM FOLLOWER
- 29B VALVE CAM FOLLOWER

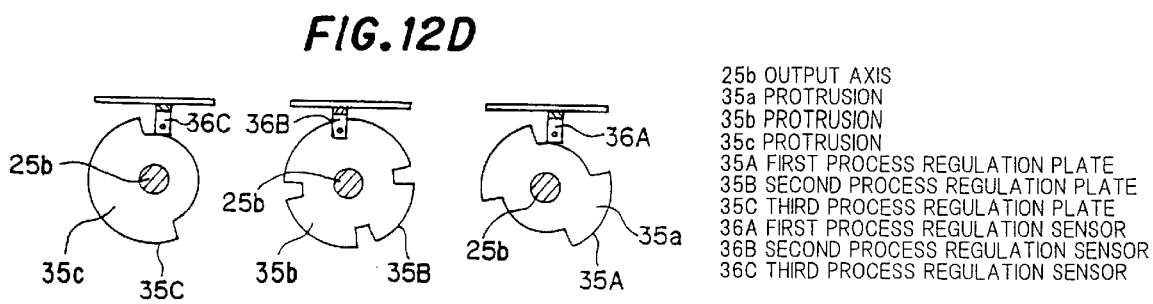

FIG.12D

- 25b OUTPUT AXIS
- 35a PROTRUSION
- 35b PROTRUSION
- 35c PROTRUSION
- 35A FIRST PROCESS REGULATION PLATE
- 35B SECOND PROCESS REGULATION PLATE
- 35C THIRD PROCESS REGULATION PLATE
- 36A FIRST PROCESS REGULATION SENSOR
- 36B SECOND PROCESS REGULATION SENSOR
- 36C THIRD PROCESS REGULATION SENSOR

FIG.13A

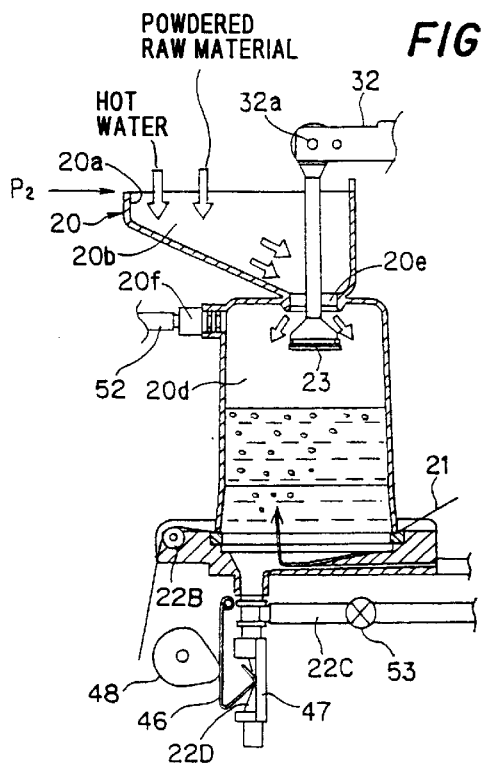

POWDERED RAW MATERIAL
HOT WATER

20 CYLINDER
20a INLET
20b MIXING CHAMBER
20d EXTRACTION CHAMBER
20e CONDUIT
20f INLET
21 PAPER FILTER
22 BEVERAGE RECEIVER
22B ROLLER
22C BEVERAGE SUPPLY TUBE
22D DRAIN TUBE
23 VALVE
46 PRESSURE PLATE
47 STATIONARY PLATE
48 PRESSING CAM
52 AIR PIPE
53 BEVERAGE SUPPLY VALVE

FIG.13B

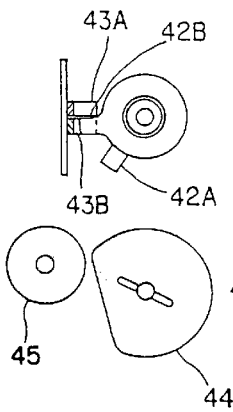

42A DRAIN TUBE OPENING DETECTION PLATE
42B DRAIN TUBE CLOSING DETECTION PLATE
43A DRAIN TUBE OPENING DETECTION SENSOR
43B DRAIN TUBE CLOSING DETECTION SENSOR
44 FILTER SUPPLY ROLLER
45 GUIDE ROLLER

FIG.13C

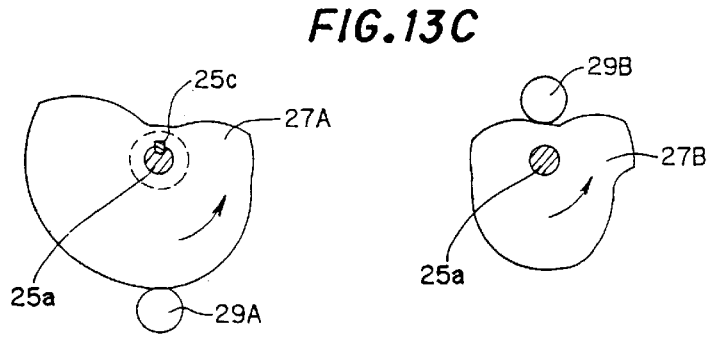

25a OUTPUT AXIS
25c KEY
27A CYLINDER CAM
27B VALVE CAM
29A CYLINDER CAM FOLLOWER
29B VALVE CAM FOLLOWER

FIG.13D

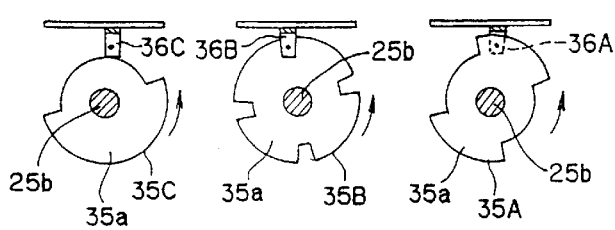

25b OUTPUT AXIS
35a PROTRUSION
35b PROTRUSION
35c PROTRUSION
35A FIRST PROCESS REGULATION PLATE
35B SECOND PROCESS REGULATION PLATE
35C THIRD PROCESS REGULATION PLATE
36A FIRST PROCESS REGULATION SENSOR
36B SECOND PROCESS REGULATION SENSOR
36C THIRD PROCESS REGULATION SENSOR

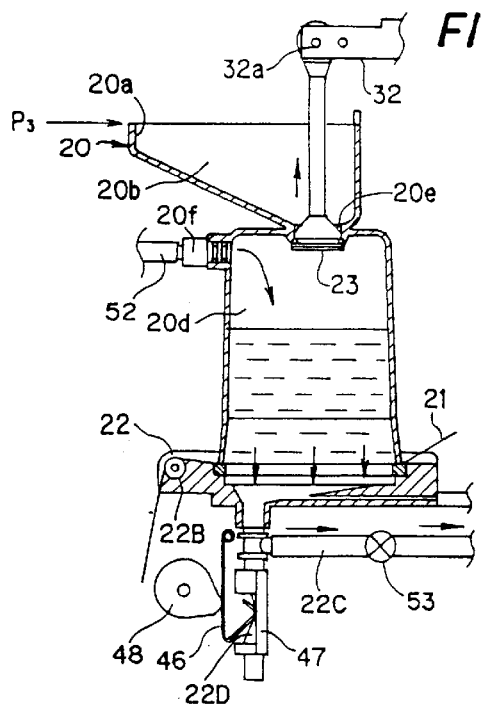

FIG.14A

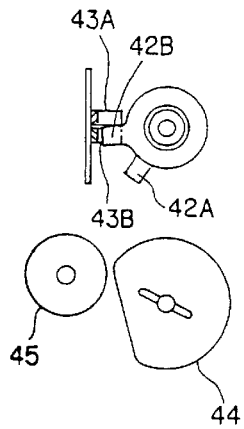

20 CYLINDER
20a INLET
20b MIXING CHAMBER
20d EXTRACTION CHAMBER
20e CONDUIT
20f INLET
21 PAPER FILTER
22 BEVERAGE RECEIVER
22B ROLLER
22C BEVERAGE SUPPLY TUBE
22D DRAIN TUBE
23 VALVE
46 PRESSURE PLATE
47 STATIONARY PLATE
48 PRESSING CAM
52 AIR PIPE
53 BEVERAGE SUPPLY VALVE

FIG.14B

42A DRAIN TUBE OPENING DETECTION PLATE
42B DRAIN TUBE CLOSING DETECTION PLATE
43A DRAIN TUBE OPENING DETECTION SENSOR
43B DRAIN TUBE CLOSING DETECTION SENSOR
44 FILTER SUPPLY ROLLER
45 GUIDE ROLLER

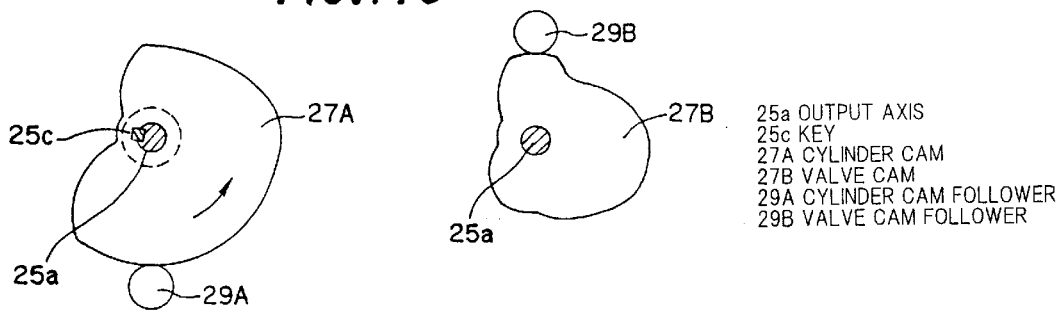

FIG.14C

25a OUTPUT AXIS
25c KEY
27A CYLINDER CAM
27B VALVE CAM
29A CYLINDER CAM FOLLOWER
29B VALVE CAM FOLLOWER

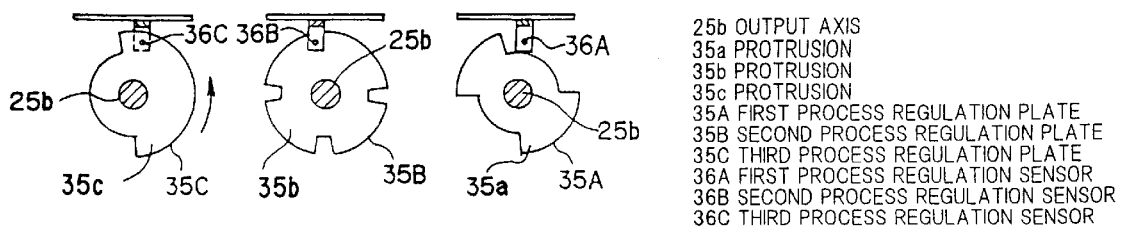

FIG.14D

25b OUTPUT AXIS
35a PROTRUSION
35b PROTRUSION
35c PROTRUSION
35A FIRST PROCESS REGULATION PLATE
35B SECOND PROCESS REGULATION PLATE
35C THIRD PROCESS REGULATION PLATE
36A FIRST PROCESS REGULATION SENSOR
36B SECOND PROCESS REGULATION SENSOR
36C THIRD PROCESS REGULATION SENSOR

FIG.18A

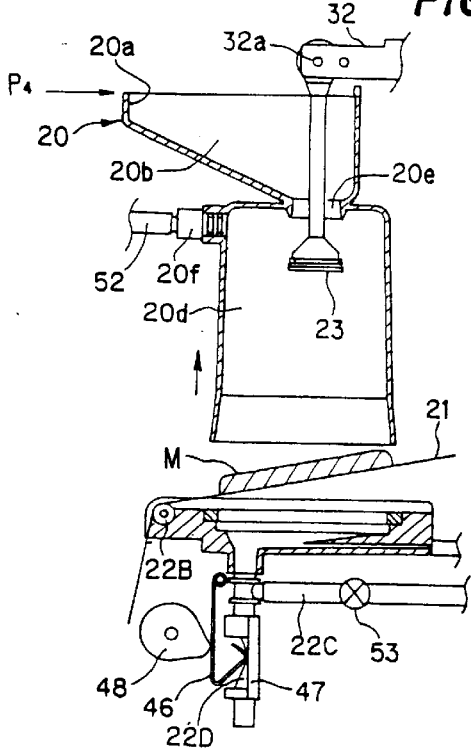

- 20 CYLINDER
- 20a INLET
- 20b MIXING CHAMBER
- 20d EXTRACTION CHAMBER
- 20e CONDUIT
- 20f INLET
- 20g TROUGH
- 20h DRAIN
- 20i DRAIN TUBE
- 21 PAPER FILTER
- 22B ROLLER
- 22C BEVERAGE SUPPLY TUBE
- 22D DRAIN TUBE
- 23 VALVE
- 46 PRESSURE PLATE
- 47 STATIONARY PLATE
- 48 PRESSING CAM
- 52 AIR PIPE
- 53 BEVERAGE SUPPLY VALVE

FIG.18B

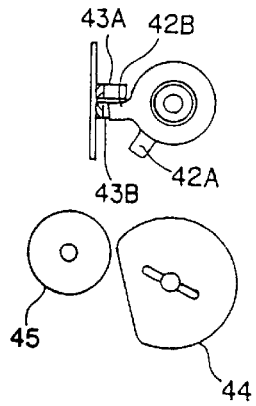

- 42A DRAIN TUBE OPENING DETECTION PLATE
- 42B DRAIN TUBE CLOSING DETECTION PLATE
- 43A DRAIN TUBE OPENING DETECTION SENSOR
- 43B DRAIN TUBE CLOSING DETECTION SENSOR
- 44 FILTER SUPPLY ROLLER
- 45 GUIDE ROLLER

FIG.18C

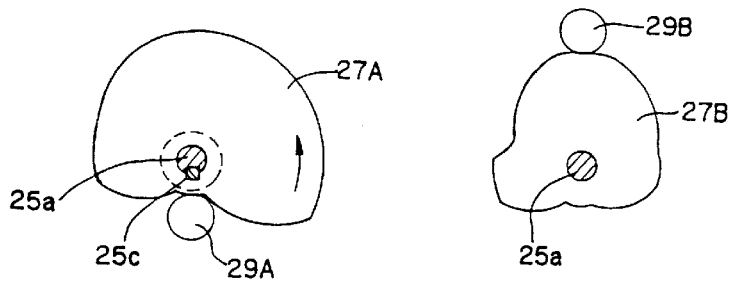

- 25a OUTPUT AXIS
- 25c KEY
- 27A CYLINDER CAM
- 27B VALVE CAM
- 29A CYLINDER CAM FOLLOWER
- 29B VALVE CAM FOLLOWER

FIG.18D

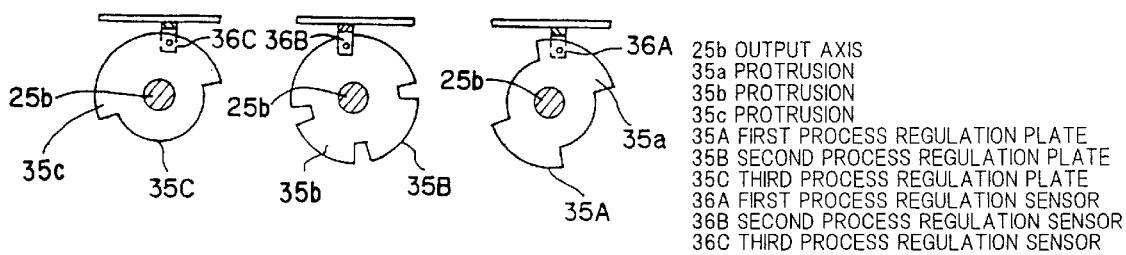

- 25b OUTPUT AXIS
- 35a PROTRUSION
- 35b PROTRUSION
- 35c PROTRUSION
- 35A FIRST PROCESS REGULATION PLATE
- 35B SECOND PROCESS REGULATION PLATE
- 35C THIRD PROCESS REGULATION PLATE
- 36A FIRST PROCESS REGULATION SENSOR
- 36B SECOND PROCESS REGULATION SENSOR
- 36C THIRD PROCESS REGULATION SENSOR

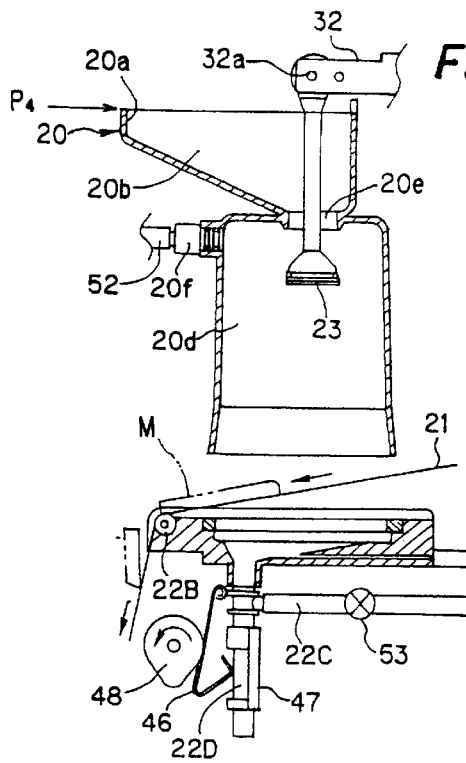
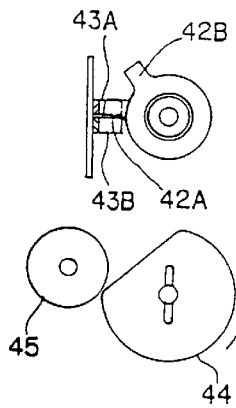

FIG.19A

20 CYLINDER
20a INLET
20b MIXING CHAMBER
20d EXTRACTION CHAMBER
20e CONDUIT
20f INLET
20g TROUGH
20h DRAIN
20i DRAIN TUBE
21 PAPER FILTER
22B ROLLER
22C BEVERAGE SUPPLY TUBE
22D DRAIN TUBE
23 VALVE
46 PRESSURE PLATE
47 STATIONARY PLATE
48 PRESSING CAM
52 AIR PIPE
53 BEVERAGE SUPPLY VALVE

FIG.19B

42A DRAIN TUBE OPENING DETECTION PLATE
42B DRAIN TUBE CLOSING DETECTION PLATE
43A DRAIN TUBE OPENING DETECTION SENSOR
43B DRAIN TUBE CLOSING DETECTION SENSOR
44 FILTER SUPPLY ROLLER
45 GUIDE ROLLER

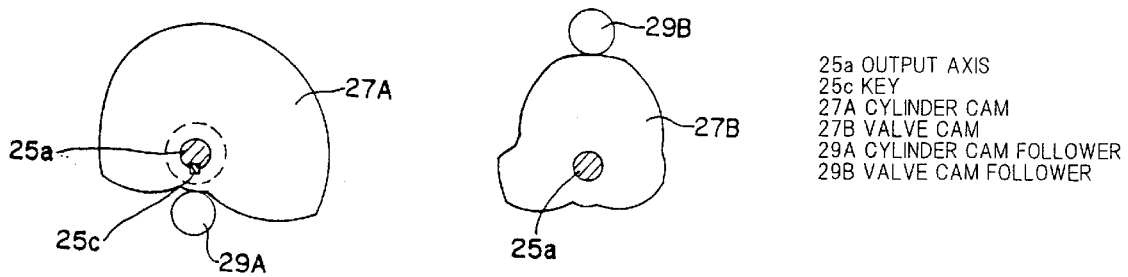

FIG.19C

25a OUTPUT AXIS
25c KEY
27A CYLINDER CAM
27B VALVE CAM
29A CYLINDER CAM FOLLOWER
29B VALVE CAM FOLLOWER

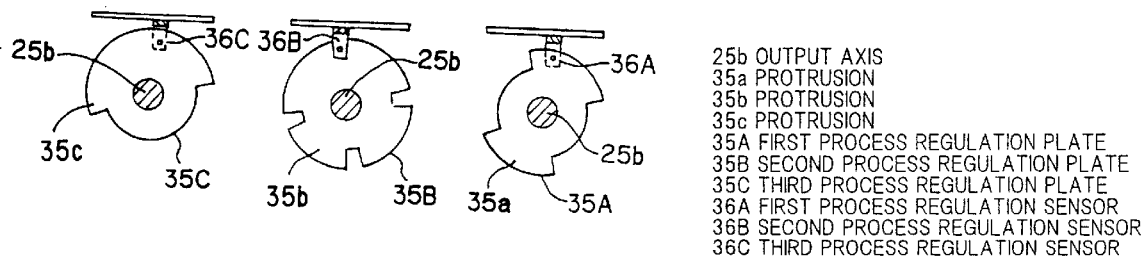

FIG.19D

25b OUTPUT AXIS
35a PROTRUSION
35b PROTRUSION
35c PROTRUSION
35A FIRST PROCESS REGULATION PLATE
35B SECOND PROCESS REGULATION PLATE
35C THIRD PROCESS REGULATION PLATE
36A FIRST PROCESS REGULATION SENSOR
36B SECOND PROCESS REGULATION SENSOR
36C THIRD PROCESS REGULATION SENSOR

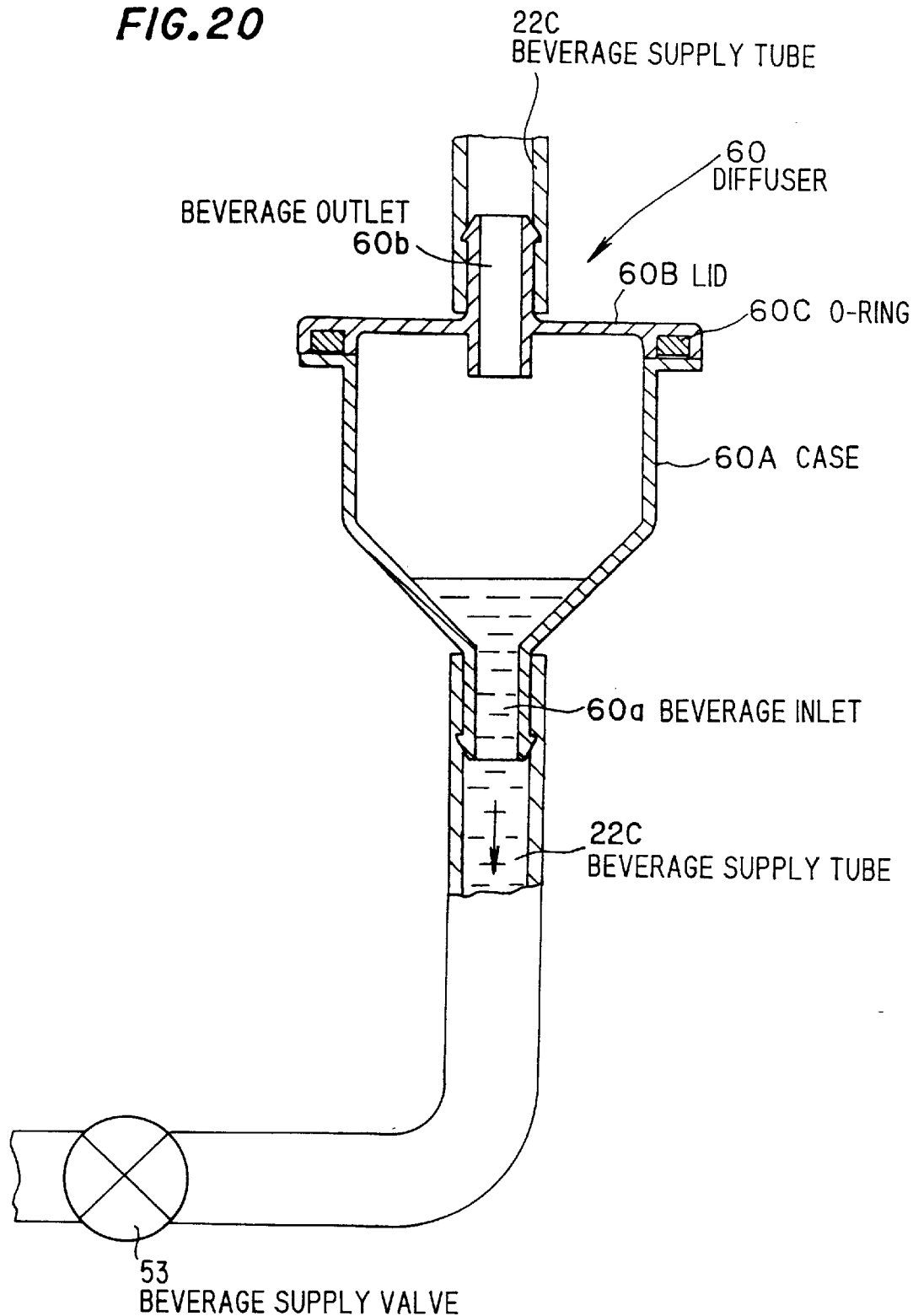

FIG.21

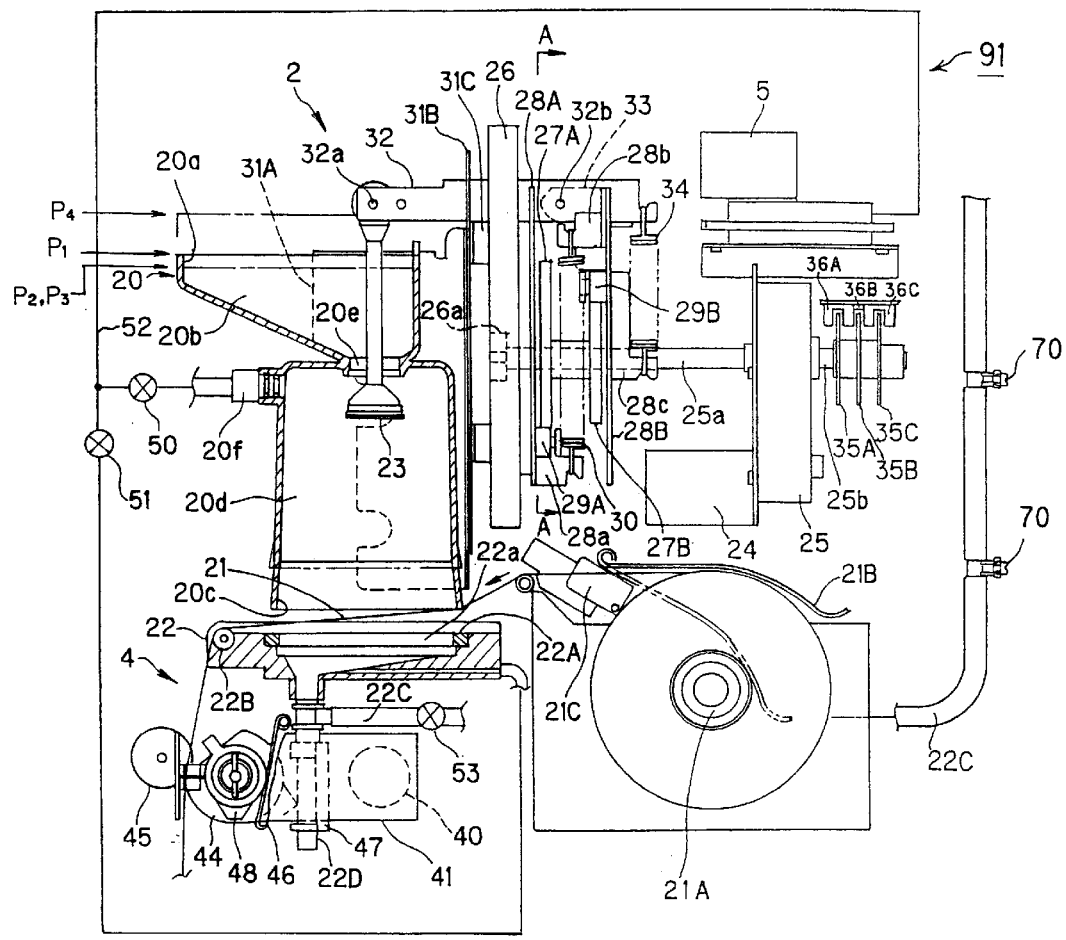

1 BEVERAGE EXTRACTION APPARATUS
2 EXTRACTION UNIT
3 AIR PUMP
4 WASTE DISPOSAL UNIT
5 AIR PUMP
6 CONTROL UNIT
7 MAIN CONTROL UNIT
20 CYLINDER
20a INLET
20b MIXING CHAMBER
20d EXTRACTION CHAMBER
20e CONDUIT
20f INLET
20g TROUGH
20h DRAIN
20i DRAIN TUBE
21 PAPER FILTER
21B FILTER AMOUNT DETECTING LEVER
21C FILTER EMPTINESS DETECTING SENSOR
22 BEVERAGE RECEIVER
22a OPENING
22c BEVERAGE SUPPLY TUBE
22A RUBBER SEAL
22B ROLLER
22C BEVERAGE SUPPLY TUBE
22D DRAIN TUBE
23 VALVE
24 EXTRACTION MOTOR
25 REDUCTION UNIT
25a OUTPUT AXIS
25b OUTPUT AXIS
25c KEY

26 SUPPORTING PLATE
26a BEARING
27A CYLINDER CAM
27B VALVE CAM
28A CYLINDER DRIVING PLATE
28B VALVE DRIVING PLATE
29A CYLINDER CAM FOLLOWER
29B VALVE CAM FOLLOWER
30 DRAWING COIL SPRING
31A, 31B, 31C CONNECTION MEMBER
32 LEVER
32a PIN
33 CONNECTING MEMBER
34 DRAWING COIL SPRING
35a PROTRUSION
35b PROTRUSION
35c PROTRUSION
35A FIRST PROCESS
　　REGULATION PLATE
35B SECOND PROCESS
　　REGULATION PLATE
35C THIRD PROCESS
　　REGULATION PLATE
36A FIRST PROCESS
　　REGULATION SENSOR
36B SECOND PROCESS
　　REGULATION SENSOR
36C THIRD PROCESS
　　REGULATION SENSOR

40 WASTE PROCESSING MOTOR
41 REDUCING UNIT
41a OUTPUT AXIS
42A DRAIN TUBE OPENING
　　DETECTION PLATE
42B DRAIN TUBE CLOSING
　　DETECTION PLATE
42a PROTRUSION
43A DRAIN TUBE OPENING
　　DETECTION SENSOR
43B DRAIN TUBE CLOSING
　　DETECTION SENSOR
44 FILTER SUPPLY ROLLER
45 GUIDE ROLLER
46 PRESSURE PLATE
46a SUPPORTING AXIS
47 STATIONARY PLATE
48 PRESSING CAM
48a PROTRUSION
50 UPPER AIR VALVE
51 LOWER AIR VALVE
52 AIR PIPE
53 BEVERAGE SUPPLY VALVE
54 T-SHAPED BRANCH
55 AIR DISCHARGE VALVE
70 ELECTRODE UNIT
91 BEVERAGE EXTRACTION
　　APPARATUS

20 CYLINDER
20a INLET
20b MIXING CHAMBER
20d EXTRACTION CHAMBER
20e CONDUIT
20f INLET
21 PAPER FILTER
22 BEVERAGE RECEIVER
22B ROLLER
22C BEVERAGE SUPPLY TUBE
22D DRAIN TUBE

23 VALVE
32 LEVER
32a PIN
46 PRESSURE PLATE
47 STATIONARY PLATE
48 PRESSING CAM
52 AIR PIPE
53 BEVERAGE SUPPLY VALVE
70 ELECTRODE UNIT

2 EXTRACTION UNIT
4 WASTE DISPOSAL
20 CYLINDER
20a INLET
20b MIXING CHAMBER
20d EXTRACTION CHAMBER
20e CONDUIT
20f INLET
21 PAPER FILTER
22 BEVERAGE RECEIVER
22B ROLLER
22C BEVERAGE SUPPLY TUBE
22D DRAIN TUBE

23 VALVE
32 LEVER
32a PIN
46 PRESSURE PLATE
47 STATIONARY PLATE
48 PRESSING CAM
52 AIR PIPE
53 BEVERAGE SUPPLY VALVE
70 ELECTRODE UNIT
71 ELECTRODE UNIT

FIG.28

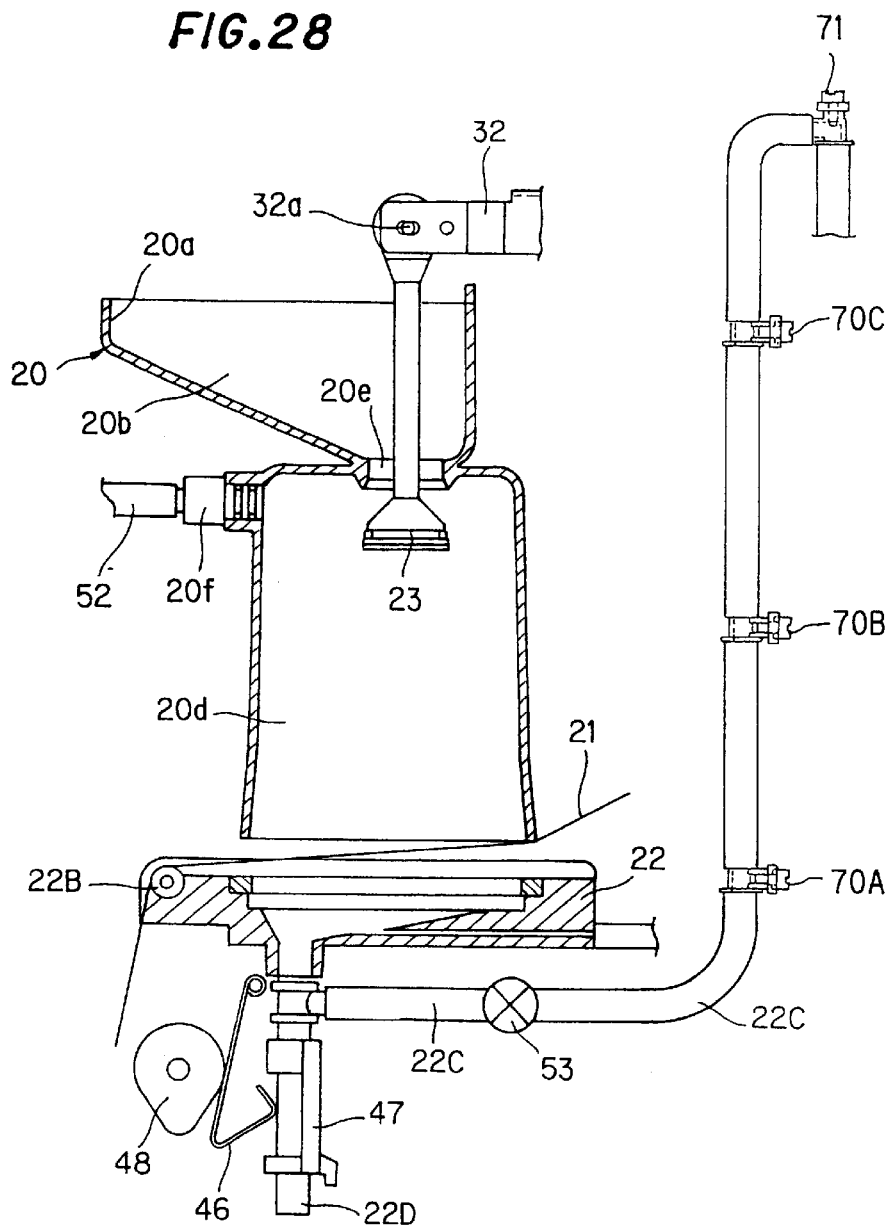

- 2 EXTRACTION UNIT
- 4 WASTE DISPOSAL
- 20 CYLINDER
- 20a INLET
- 20b MIXING CHAMBER
- 20d EXTRACTION CHAMBER
- 20e CONDUIT
- 20f INLET
- 20g TROUGH
- 20h DRAIN
- 20i DRAIN TUBE
- 21 PAPER FILTER
- 22A RUBBER SEAL
- 22B ROLLER
- 22C BEVERAGE SUPPLY TUBE
- 22D DRAIN TUBE
- 23 VALVE
- 32 LEVER
- 32a PIN
- 46 PRESSURE PLATE
- 47 STATIONARY PLATE
- 48 PRESSING CAM
- 52 AIR PIPE
- 53 BEVERAGE SUPPLY VALVE
- 70A ELECTRODE UNIT
- 70B ELECTRODE UNIT
- 70C ELECTRODE UNIT
- 71 ELECTRODE UNIT

FIG.29

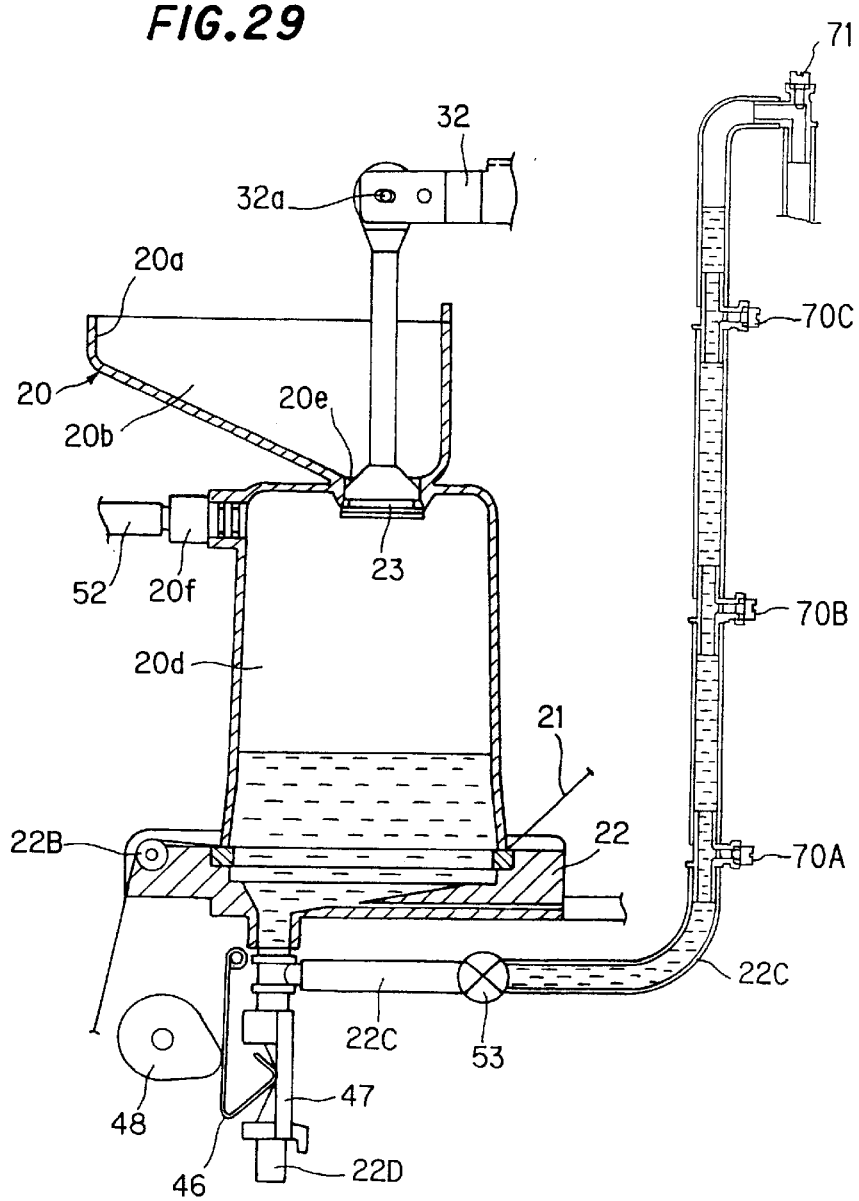

2 EXTRACTION UNIT
4 WASTE DISPOSAL
20 CYLINDER
20a INLET
20b MIXING CHAMBER
20d EXTRACTION CHAMBER
20e CONDUIT
20f INLET
20g TROUGH
20h DRAIN
20i DRAIN TUBE
21 PAPER FILTER
22a OPENING
22A RUBBER SEAL
22B ROLLER
22C BEVERAGE SUPPLY TUBE
22D DRAIN TUBE

23 VALVE
32 LEVER
32a PIN
46 PRESSURE PLATE
47 STATIONARY PLATE
48 PRESSING CAM
52 AIR PIPE
53 BEVERAGE SUPPLY VALVE
70A ELECTRODE UNIT
70B ELECTRODE UNIT
70C ELECTRODE UNIT
71 ELECTRODE UNIT

FIG.30

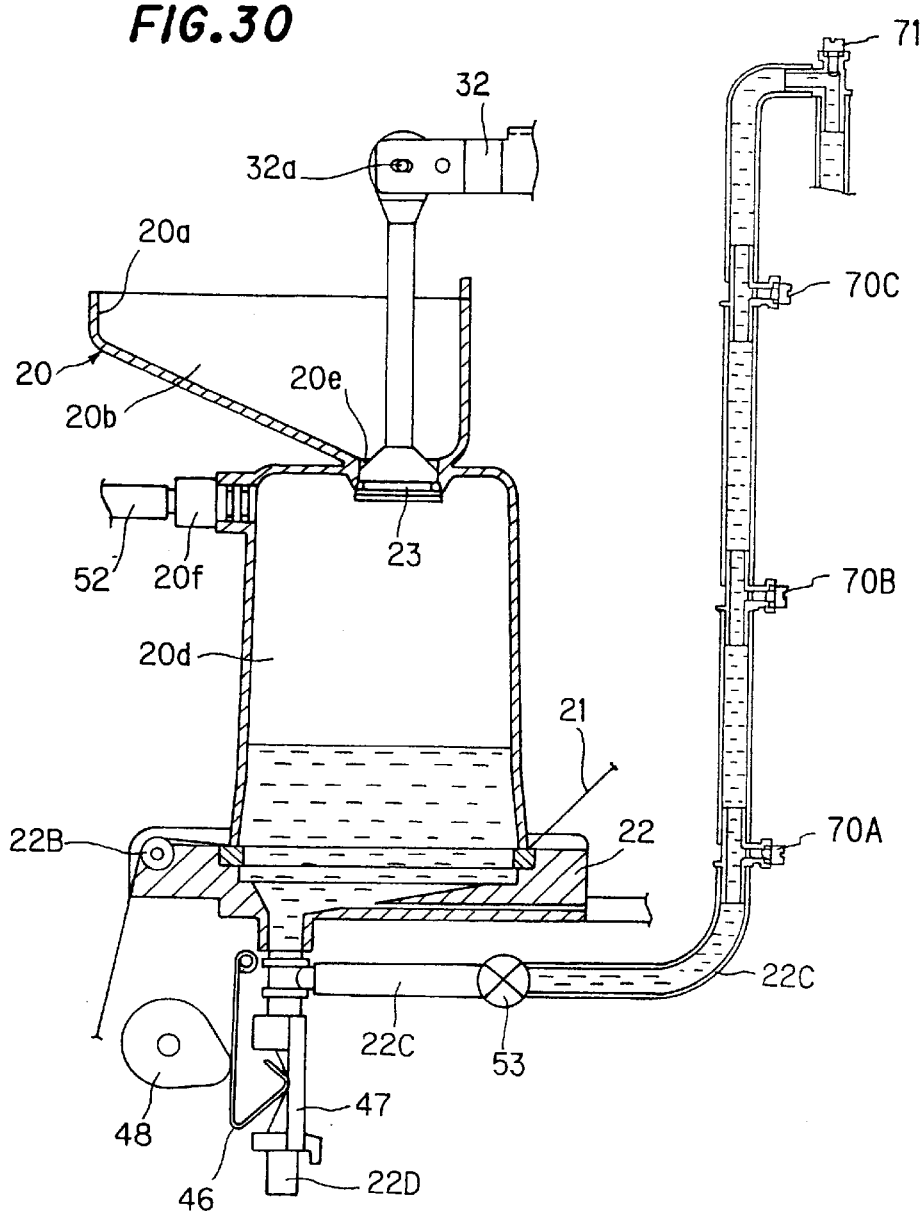

2 EXTRACTION UNIT
4 WASTE DISPOSAL
20 CYLINDER
20a INLET
20b MIXING CHAMBER
20d EXTRACTION CHAMBER
20e CONDUIT
20f INLET
20g TROUGH
20h DRAIN
20i DRAIN TUBE
21 PAPER FILTER
22a OPENING
22A RUBBER SEAL
22B ROLLER
22C BEVERAGE SUPPLY TUBE
22D DRAIN TUBE

23 VALVE
32 LEVER
32a PIN
46 PRESSURE PLATE
47 STATIONARY PLATE
48 PRESSING CAM
52 AIR PIPE
53 BEVERAGE SUPPLY VALVE
70A ELECTRODE UNIT
70B ELECTRODE UNIT
70C ELECTRODE UNIT
71 ELECTRODE UNIT

FIG.31

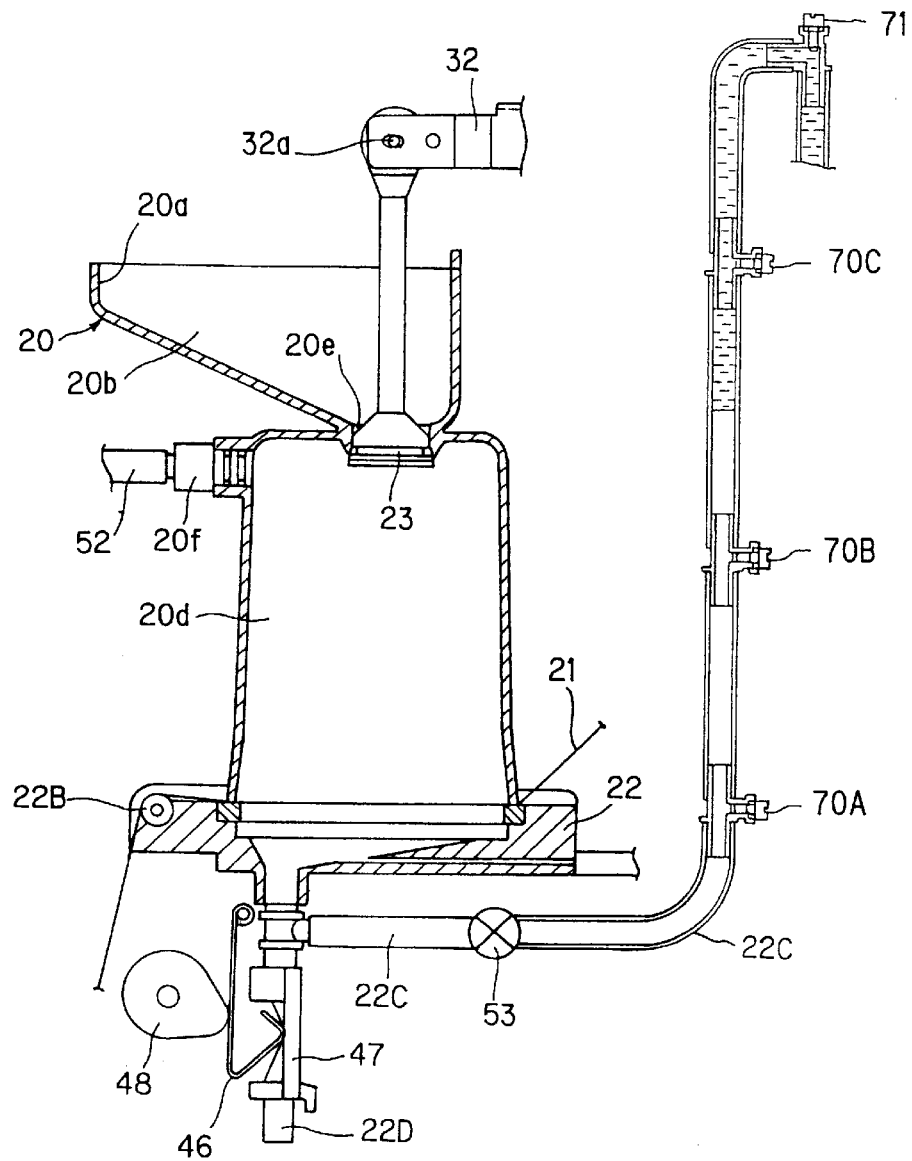

2 EXTRACTION UNIT
4 WASTE DISPOSAL
20 CYLINDER
20a INLET
20b MIXING CHAMBER
20d EXTRACTION CHAMBER
20e CONDUIT
20f INLET
20g TROUGH
20h DRAIN
20i DRAIN TUBE
21 PAPER FILTER
22a OPENING
22A RUBBER SEAL
22B ROLLER
22C BEVERAGE SUPPLY TUBE
22D DRAIN TUBE

23 VALVE
32 LEVER
32a PIN
46 PRESSURE PLATE
47 STATIONARY PLATE
48 PRESSING CAM
52 AIR PIPE
53 BEVERAGE SUPPLY VALVE
70A ELECTRODE UNIT
70B ELECTRODE UNIT
70C ELECTRODE UNIT
71 ELECTRODE UNIT

FIG.32

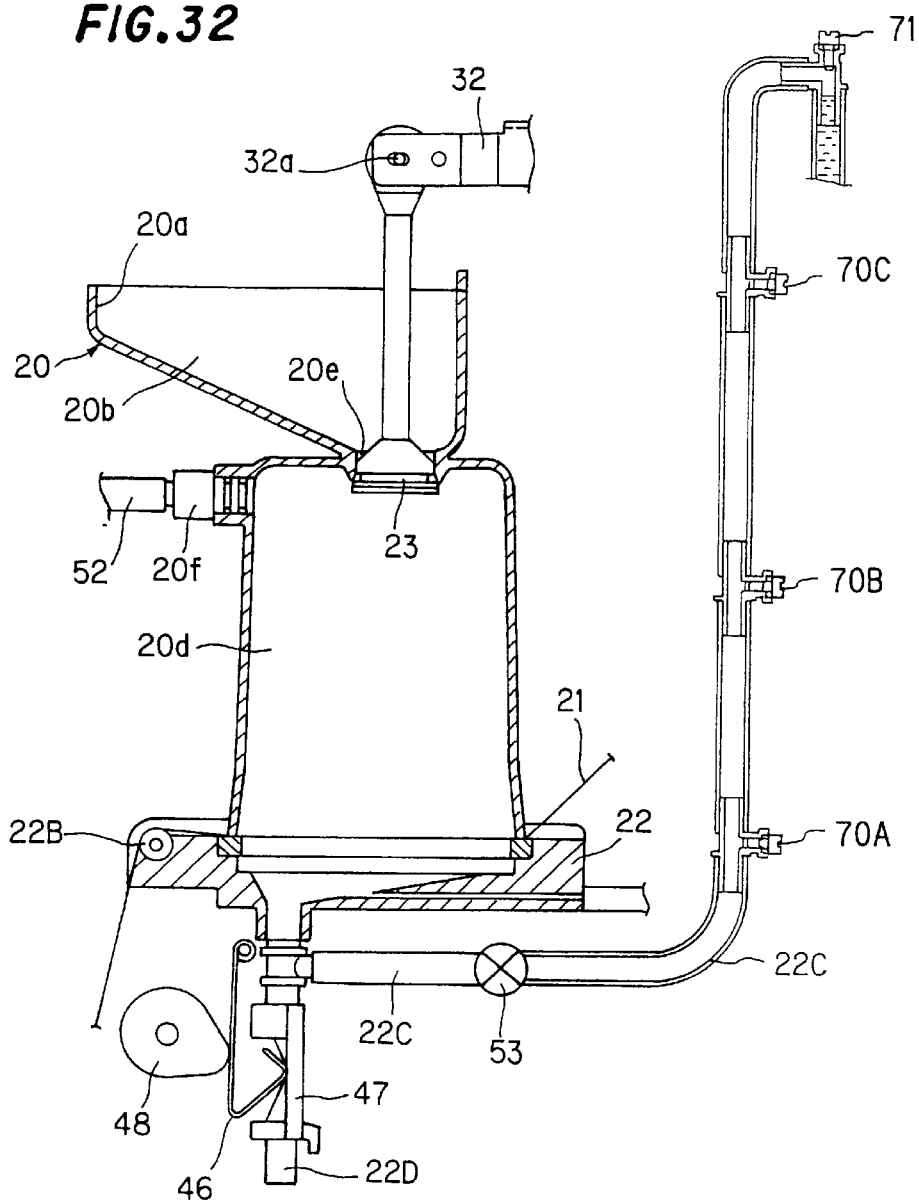

2 EXTRACTION UNIT
4 WASTE DISPOSAL
20 CYLINDER
20a INLET
20b MIXING CHAMBER
20d EXTRACTION CHAMBER
20e CONDUIT
20f INLET
20g TROUGH
20h DRAIN
20i DRAIN TUBE
21 PAPER FILTER
22a OPENING
22A RUBBER SEAL
22B ROLLER
22C BEVERAGE SUPPLY TUBE
22D DRAIN TUBE

23 VALVE
32 LEVER
32a PIN
46 PRESSURE PLATE
47 STATIONARY PLATE
48 PRESSING CAM
52 AIR PIPE
53 BEVERAGE SUPPLY VALVE
70A ELECTRODE UNIT
70B ELECTRODE UNIT
70C ELECTRODE UNIT
71 ELECTRODE UNIT

2 EXTRACTION UNIT
4 WASTE DISPOSAL
20 CYLINDER
20a INLET
20b MIXING CHAMBER
20d EXTRACTION CHAMBER
20e CONDUIT
20f INLET
20g TROUGH
20h DRAIN
20i DRAIN TUBE
21 PAPER FILTER
22a OPENING
22A RUBBER SEAL
22B ROLLER
22C BEVERAGE SUPPLY TUBE
22D DRAIN TUBE

23 VALVE
32 LEVER
32a PIN
46 PRESSURE PLATE
47 STATIONARY PLATE
48 PRESSING CAM
52 AIR PIPE
53 BEVERAGE SUPPLY VALVE
70A ELECTRODE UNIT
70B ELECTRODE UNIT
71 ELECTRODE UNIT

FIG.34

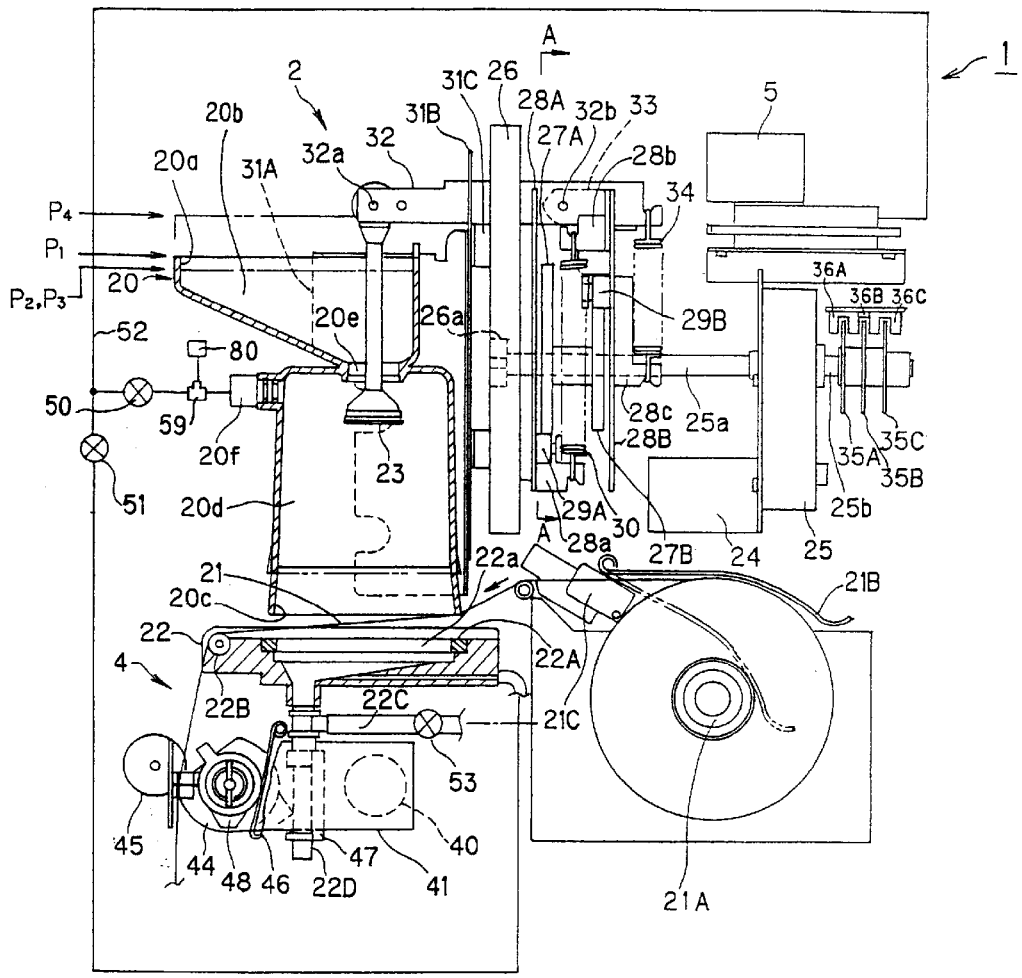

1 BEVERAGE EXTRACTION APPARATUS
2 EXTRACTION UNIT
3 AIR PUMP
4 WASTE DISPOSAL UNIT
5 AIR PUMP
6 CONTROL UNIT
7 MAIN CONTROL UNIT
20 CYLINDER
20a INLET
20b MIXING CHAMBER
20d EXTRACTION CHAMBER
20e CONDUIT
20f INLET
21 PAPER FILTER
21B FILTER AMOUNT DETECTING LEVER
21C FILTER EMPTINESS DETECTING SENSOR
22 BEVERAGE RECEIVER
22a OPENING
22c BEVERAGE SUPPLY TUBE
22A RUBBER SEAL
22B ROLLER
22C BEVERAGE SUPPLY TUBE
22D DRAIN TUBE
23 VALVE
24 EXTRACTION MOTOR
25 REDUCTION UNIT
25a OUTPUT AXIS
25b OUTPUT AXIS
25c KEY

26 SUPPORTING PLATE
26a BEARING
27A CYLINDER CAM
27B VALVE CAM
28A CYLINDER DRIVING PLATE
28B VALVE DRIVING PLATE
29A CYLINDER CAM FOLLOWER
29B VALVE CAM FOLLOWER
30 DRAWING COIL SPRING
31A, 31B, 31C CONNECTION MEMBER
32 LEVER
32a PIN
33 CONNECTING MEMBER
34 DRAWING COIL SPRING
35a PROTRUSION
35b PROTRUSION
35c PROTRUSION
35A FIRST PROCESS
    REGULATION PLATE
35B SECOND PROCESS
    REGULATION PLATE
35C THIRD PROCESS
    REGULATION PLATE
36A FIRST PROCESS
    REGULATION SENSOR
36B SECOND PROCESS
    REGULATION SENSOR
36C THIRD PROCESS
    REGULATION SENSOR

40 WASTE PROCESSING MOTOR
41 REDUCING UNIT
41a OUTPUT AXIS
42A DRAIN TUBE OPENING
    DETECTION PLATE
42B DRAIN TUBE CLOSING
    DETECTION PLATE
42a PROTRUSION
43A DRAIN TUBE OPENING
    DETECTION SENSOR
43B DRAIN TUBE CLOSING
    DETECTION SENSOR
44 FILTER SUPPLY ROLLER
45 GUIDE ROLLER
46 PRESSURE PLATE
46a SUPPORTING AXIS
47 STATIONARY PLATE
48 PRESSING CAM
48a PROTRUSION
50 UPPER AIR VALVE
51 LOWER AIR VALVE
52 AIR PIPE
53 BEVERAGE SUPPLY VALVE
54 T-SHAPED BRANCH
55 AIR DISCHARGE VALVE
59 BRANCH
80 PRESSURE SENSOR

FIG.39

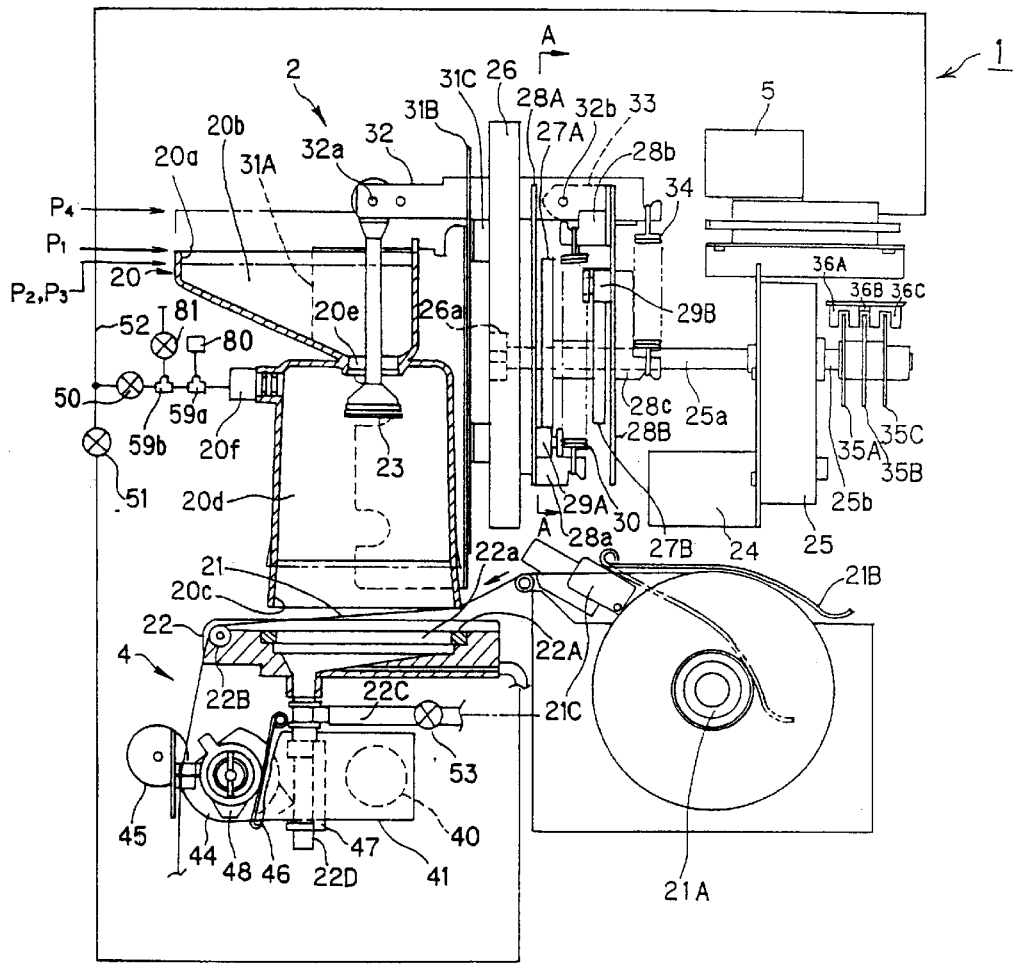

| 1 BEVERAGE EXTRACTION APPARATUS | 26 SUPPORTING PLATE | 40 WASTE PROCESSING MOTOR |
|---|---|---|
| 2 EXTRACTION UNIT | 26a BEARING | 41 REDUCING UNIT |
| 3 AIR PUMP | 27A CYLINDER CAM | 41a OUTPUT AXIS |
| 4 WASTE DISPOSAL UNIT | 27B VALVE CAM | 42A DRAIN TUBE OPENING DETECTION PLATE |
| 5 AIR PUMP | 28A CYLINDER DRIVING PLATE | 42B DRAIN TUBE CLOSING DETECTION PLATE |
| 6 CONTROL UNIT | 28B VALVE DRIVING PLATE | 42a PROTRUSION |
| 7 MAIN CONTROL UNIT | 29A CYLINDER CAM FOLLOWER | 43A DRAIN TUBE OPENING DETECTION SENSOR |
| 20 CYLINDER | 29B VALVE CAM FOLLOWER | 43B DRAIN TUBE CLOSING DETECTION SENSOR |
| 20a INLET | 30 DRAWING COIL SPRING | 44 FILTER SUPPLY ROLLER |
| 20b MIXING CHAMBER | 31A, 31B, 31C CONNECTION MEMBER | 45 GUIDE ROLLER |
| 20d EXTRACTION CHAMBER | 32 LEVER | 46 PRESSURE PLATE |
| 20e CONDUIT | 32a PIN | 46a SUPPORTING AXIS |
| 20f INLET | 33 CONNECTING MEMBER | 47 STATIONARY PLATE |
| 21 PAPER FILTER | 34 DRAWING COIL SPRING | 48 PRESSING CAM |
| 21B FILTER AMOUNT DETECTING LEVER | 35a PROTRUSION | 48a PROTRUSION |
| 21C FILTER EMPTINESS DETECTING SENSOR | 35b PROTRUSION | 50 UPPER AIR VALVE |
| 22 BEVERAGE RECEIVER | 35c PROTRUSION | 51 LOWER AIR VALVE |
| 22a OPENING | 35A FIRST PROCESS REGULATION PLATE | 52 AIR PIPE |
| 22A RUBBER SEAL | 35B SECOND PROCESS REGULATION PLATE | 53 BEVERAGE SUPPLY VALVE |
| 22B ROLLER | 35C THIRD PROCESS REGULATION PLATE | 54 T-SHAPED BRANCH |
| 22C BEVERAGE SUPPLY TUBE | 36A FIRST PROCESS REGULATION SENSOR | 55 AIR DISCHARGE VALVE |
| 22D DRAIN TUBE | 36B SECOND PROCESS REGULATION SENSOR | 59a BRANCH |
| 23 VALVE | 36C THIRD PROCESS REGULATION SENSOR | 59b BRANCH |
| 24 EXTRACTION MOTOR | | 80 PRESSURE SENSOR |
| 25 REDUCTION UNIT | | 81 PRESSURE RELEASING VALVE |
| 25a OUTPUT AXIS | | |
| 25b OUTPUT AXIS | | |
| 25c KEY | | |

ABEVERAGE EXTRACTION APPARATUS

FIELD OF THE INVENTION

This invention relates to a beverage extraction apparatus, and more particularly to a beverage extraction apparatus in which a mixture of powdered raw material and hot water is filtered under air pressure.

BACKGROUND OF THE INVENTION

An example of conventional beverage extraction apparatus is that disclosed in Japanese Utility Model Laid Open No.Sho61-118526. As shown in FIG. 1, beverage: extraction apparatus 100 is provided with cylinder 101 supported to be movable up and down to which a mixture of a powdered raw material and hot water is supplied from upward and discharged downward, filter 102 for filtration of the mixture discharged from cylinder 101. beverage receiver 104 having rubber,seal 103 to receive the beverage extracted by filtration with filter 102, beverage supply tube 105 for supplying the beverage to a cup, cam system 106 consisting of pressure plate 106a and cam 106b, and a control system (not shown) to control each par; of beverage extraction apparatus 100. Filter 102 is placed under cylinder 101. Beverage supply tube 105 is connected with beverage receiver 104.

Cylinder 101 is provided with mixing chamber 101b for mixing the powdered raw material and water supplied from inlet 101a placed in the upper part thereof and extraction chamber 101d in which the beverage is extracted and discharged from outlet 101c placed in the lower part thereof. Mixing chamber 101b is communicated with extraction chamber 101d by way of conduit 101e, which is opened or closed by means of valve 107. Air pipe 109 is connected with extraction chamber 101d in order to introduce compressed air into extraction chamber 101d from air pump 108.

In beverage extraction apparatus 100 thus constructed, the control unit, not shown, drives an extraction driving motor (not shown) according to serving signal inputted therein, thereby cylinder 101 is lowered from stand-by position P and its lower end is brought into contact with rubber seal 103 on beverage receiver 104. Thereafter, the powdered raw material and hot water are supplied from inlet 101a. The control unit drives air pump 108 to supply compressed air to extraction chamber 101d through air pipe 109. In this state, valve 107 is opened a little, thereby, the compressed air is supplied from extraction chamber 110d through conduit 101e to mixing chamber 101b, so as to agitate the mixture of powdered raw material and hot water supplied to mixing chamber 101b. When the mixture is stirred sufficiently, air pump 108 is allowed to stop and the mixture flows into extraction chamber 111d through conduit 110e.

FIG. 2 shows the extraction process. The control unit drives the extraction driving motor to elevate valve 107 so as to close conduit 101e, and drives also air pump 168 to supply compressed air to extraction chamber 101d through air pipe 109. The mixture stored in extraction chamber 110d is filtered by filter 102, being forced by the compressed air. The pressure applied to beverage supply tube 105 by pressure plate 106a is removed by the rotation of cam 106b in a predetermined angle according to driving of a serving motor (not shown), thereby beverage supply tube 105 is opened.

When the beverage filtered by filter 102 is supplied to a serving cup (not shown) through beverage supply tube 105, cylinder 101 is moved to waste disposal position P' shown in FIG. 2, filter 102 is removed from beverage receiver 104, and the waste left on the filter 102 is discarded, being controlled by the control unit. The extraction process is thus finished. The control unit drives extraction driving motor so that cylinder 101 returns to position P.

In such a beverage extraction apparatus in which the mixture of powdered raw material and hot water is extracted under air pressure, time for filtration varies depending on the resistance on passage of the water through the filter, kind of the raw material, fineness of the powder, and quantity of the raw material.

FIGS. 3A to 3D show the change of pressure within the cylinder during filtration in the beverage extraction apparatus. FIG. 3A shows the pressure change in the case where a predetermined amount of the powdered raw material is used. After the filtration is started at time A, the pressure within the cylinder is elevated. At time B when most of the liquid component in the cylinder is filtered, the pressure decreases. After air blowing is conducted for a predetermined period for preventing the extracted beverage solution from remaining in the beverage supply tube, pressure in the cylinder is removed at time C. FIG. 3B shows the change in pressure when the amount of the raw material is increased. The time B when most of the liquid component is filtered is delayed compared to the time B shown in FIG. 3A. Moreover, the pressure is increased because the waste of powdered raw material deposited on the filter after filtration is increased to have a greater thickness.

With respect to a beverage vendor provided with the beverage extraction apparatus mentioned above, there are two modes of extraction, of which one is timely extraction in which the beverage is extracted in cups one by one on demand of service and the other is batch extraction in which a lot of beverage is extracted once and stored in a tank. In batch extraction, the powdered law material and hot water come into contact more gently than in timely extraction. Thus, a beverage of better quality having less bitter and less impure taste can be extracted. In batch extraction, a beverage of high quality can be served quickly even when the serving is very busy because the beverage stored in the tank is served on demandiof service.

FIG. 3C shows the change in pressure in the cylinder in the case of batch extraction. Low pressure of air is applied to the mixture of a powdered raw material and hot water to filter it in a long period, thus, time B when almost all of the liquid component is filtered is delayed compared to time B shown in FIG. 3B.

As described above, the time required for filtration varies depending on the manner of extraction. In an arrangement, for example, in which filtration is terminated by a timer, it is necessary to set a time for filtration in slight excess so that the filtration is complete in substance when the time set for filtration is over. The time for complete filtration may deviate from the time set by the timer, due to the changes in the amount of powdered raw material and hot water, pressure loss in pipings, fluctuation of the air pump and so on. If the filtration time is too short, filtration is not enough. If the filtration time is too long, compression by air is continued on the waste of the raw material from which the liquid component has been filtered out, resulting in extraction of astringency, bitter and other useless components.

A beverage extraction apparatus free from such obstruction is disclosed, for example, in Japanese Patent Laid Open No.Sho63-12088. In this beverage extraction apparatus, filtration is terminated by detecting the change in pressure within the hot water-supplying cylinder according to the finishing of filtration by means of a pressure sensor. Other arrangements of beverage extraction apparatus are disclosed in Japanese Patent Laid Open No.Sho63-47899 and Japanese Patent Laid Open No.Hei4-188396, in which the change in pressure within the hot water-supplying cylinder is detected by a pressure sensor. Various measures have been taken against defective filtration so far.

In the beverage extraction apparatuses described above, the mixture of a powdered raw material and hot water is agitated by compressed air in order to accelerate extraction to accomplish efficient extraction of the beverage on demand of service, but degrees of dissolution of the components of beverage, such as taste components, astringent components, bitter components and sour components, vary according to the intensity of agitation. The rate of extraction of the beverage can be increased by more vigorous agitation, which accelerates simultaneously the dissolution of undesirable components such as an impure taste.

A beverage extraction apparatus solving such problem is disclosed in Japanese Patent Laid Open No. Hei9-147229. In this beverage extraction apparatus, compressed air in an amount in accordance with the degree of extraction is supplied to agitate the powdered raw material and hot water, and thereafter the air is supplied to the extraction chamber to filter the mixture.

In a conventional beverage extraction apparatus in which the pressure within the water supplying cylinder is detected to terminate the filtration, the pressure within the water supplying cylinder tends to vary depending on the manner of extraction, so that no definite pressure difference is produced during the filtration and even after completion of the filtration sometimes in the case of low pressure extraction, such as batch extraction. Therefore, the completion of filtration is not determined, causing extraction of bitter and astringency. In a conventional beverage extraction apparatus in which the air pressure during the agitation is adjusted, the pressure in the later period of filtration is elevated too high because of the arrangement to increase the air pressure as time passes. whereby defective filtration sometimes occurs.

SUMMARY OF THE INVENTION

Accordingly, it is an object of the invention to provide a beverage extraction apparatus prevented from defective filtration, thus capable of extracting a beverage with good quality.

According to the first feature of the inventions a beverage extraction apparatus for extracting a beverage by filtering a mixture of a raw material of the beverage, such as coffee, black tea, green tea, and so on and hot water comprises:
an extraction chamber for extracting the beverage from the mixture by filtration with a filter;
a beverage supply tube and a drain tube, either connected with the extraction chamber; and
a control means which supplies the extracted beverage to the beverage supply tube when the amount of the extracted beverage is greater than a predetermined amount and drains the extract to the drain tube when the amount of the extracted beverage is less than the predetermined amount.

According to the second feature of the invention, a beverage extraction apparatus for extracting a beverage by filtering a mixture of a raw material for beverage such as coffee, black tea, green tea and so on and hot water comprises:
means for detecting the beverage in the beverage supply tube; and
means for controlling the filtration operation of the mixture according to the signal detecting the beverage.

According to the third feature of the invention, a beverage extraction apparatus for extracting a beverage by filtering a mixture of a raw material for beverage such as coffee, black tea, green tea and so on and hot water comprises:
an extraction chamber;
a filter for the filtering;
an air pump for supplying compressed air into the extraction chamber; and
means for adjusting the pressure in the extraction chamber during filtering to a pressure smaller than a predetermined pressure.

In the beverage extraction apparatus, it is preferred that the beverage supply tube has a diffuser with enlarging inner diameter in the supplying conduit, the drain tube is communicated with the diffuser through the beverage supply tube and the beverage is discharged after the extracted beverage is degasified. It is also preferred that a predetermined amount of the extracted beverage stored in the diffuser and the beverage supply tube is discharged through the drain tube.

In the beverage extraction apparatus according to the invention, beverage detecting means may be a pair of electrodes to cause conduction through the beverage, may be a sensor detecting the presence and the absence of beverage in the beverage supply tube by the conduction between a pair of electrodes, or maybe a sensor detecting the flow of the beverage consisting of a pair of electrodes one of which, located downstream relative to the other, is located at the uppermost position in the path of the beverage supply tube or at the portion on the beverage-serving side of the uppermost position and the presence of the beverage is detected by the conduction between the two electrodes. The beverage detecting means may be composed of a beverage presence and absence-detecting sensor and a flow-detecting sensor. At least one of the pair of electrodes may be used for a beverage presence and absence-detecting sensor and a flow-detecting sensor in common.

In the beverage extraction apparatus according to the invention, the pressure detecting means may be composed of a pressure detecting means which detects the pressure in the extraction chamber during the extraction to output a pressure signal and a control means for controlling the duty ratio of on and off of the air pump according to the pressure signal. Alternatively, the pressure detecting means may be composed of a pressure detecting means which detects the pressure in the extraction chamber during the filtration to output a pressure signal, a pressure releasing valve for reducing the pressure in the extraction chamber during the filtration and a control means for operating the pressure releasing valve according to the pressure signal when the pressure in the extraction chamber during the filtration exceeds a predetermined pressure. The pressure adjusting means may have a memory for storing the pressure predetermined according to the extraction concentration (concentration of the beverage to be extracted).

BRIEF DESCRIPTION OF THE DRAWINGS

The invention will be described in more detail in conjunction with the accompanying drawings, wherein:

FIG. 4 is an explanatory view of the beverage extraction apparatus in the first preferred embodiment of the invention;

FIG. 10 is a timing chart with respect to the output signals of the first, second and process inspection sensors in the first preferred embodiment of the invention:

FIG. 11A–11D are explanatory views of the beverage extraction apparatus in the stand-by status in the first preferred embodiment of the invention;

FIG. 12A–12D are explanatory views of the beverage extraction apparatus with the drain tube closed in the first preferred embodiment of the invention;

FIG. 13A–13D are explanatory views, and of the beverage extraction apparatus in the agitation process in the first preferred embodiment of the invention;

FIG. 14A–14D are explanatory views of the beverage extraction apparatus in the extraction process in the first preferred embodiment of the invention;

FIG. 18A–18D are explanatory views; and of the beverage extraction apparatus at the start of waste disposal process in the first preferred embodiment of the invention;

FIG. 19A–19D are explanatory views of the beverage extraction apparatus in which the waste disposal process is finished in the first preferred embodiment of the invention;

FIG. 20 is an explanatory view showing the beverage supplied to the diffuser in the draining process;

FIG. 21 is an explanatory view of the beverage extraction apparatus in the second preferred embodiment of the invention;

FIG. 28 is an explanatory view of the beverage extraction apparatus in the fourth preferred embodiment of the invention;

FIG. 29 is an explanatory view of the beverage extraction apparatus in the fourth preferred embodiment of the invention;

FIG. 30 is an explanatory view of the beverage extraction apparatus in the fourth preferred embodiment of the invention;

FIG. 31 is an explanatory view of the beverage extraction apparatus in the fourth preferred embodiment of the invention;

FIG. 32 is an explanatory view of the beverage extraction apparatus in the fourth preferred embodiment of the invention;

FIG. 34 is an explanatory view of the beverage extraction apparatus in the sixth preferred embodiment of the invention;

FIG. 39 is an explanatory view of the beverage extraction apparatus in the seventh preferred embodiment of the invention.

PREFERRED EMBODIMENTS OF THE INVENTION

Figure 1:
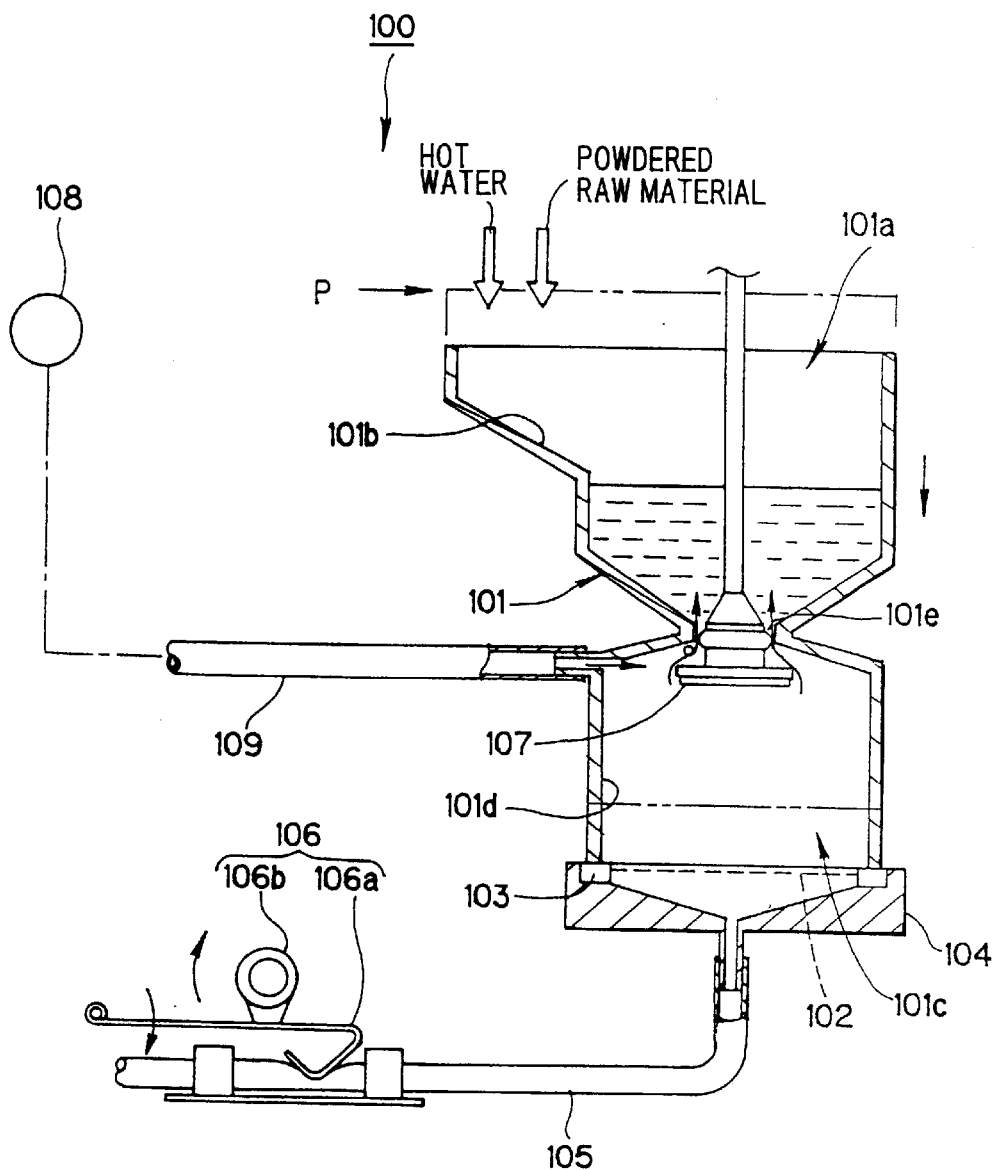
FIG. 1 is an explanatory view of the agitation process in a conventional beverage extraction apparatus.
Figure 2:
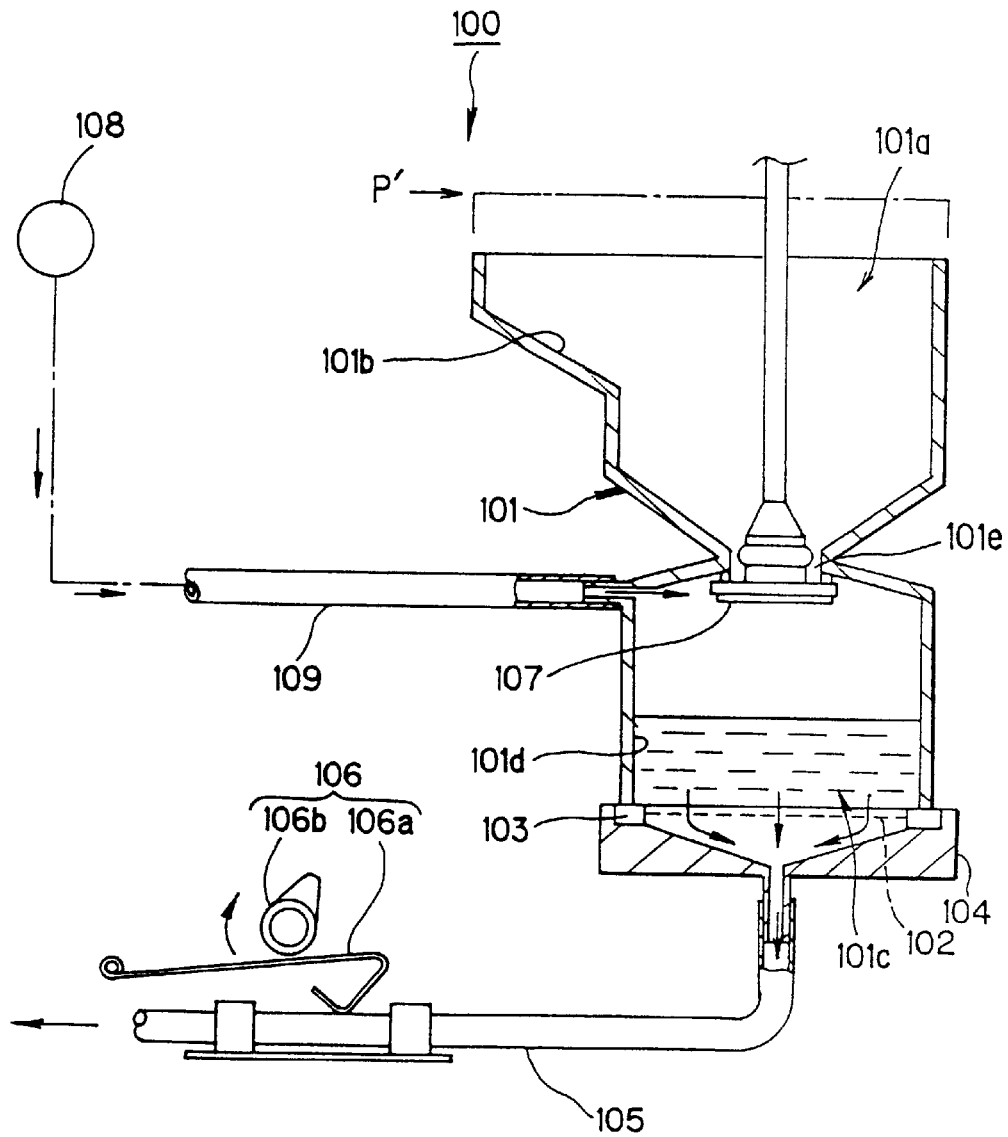
FIG. 2 is an explanatory view of the extraction process in a conventional beverage extraction apparatus.
Figure 3A:
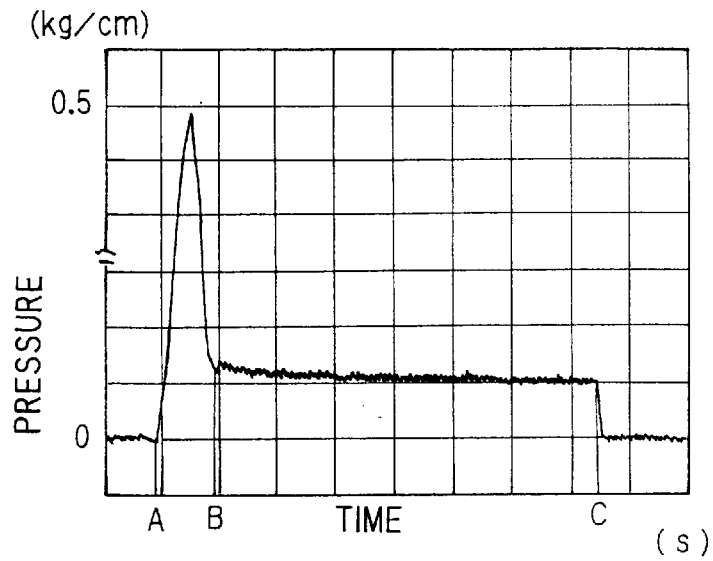
FIGS. 3A–3C are explanatory views of the filtration pressure and the time during the filtration in a conventional beverage extraction apparatus.
Figure 3B:
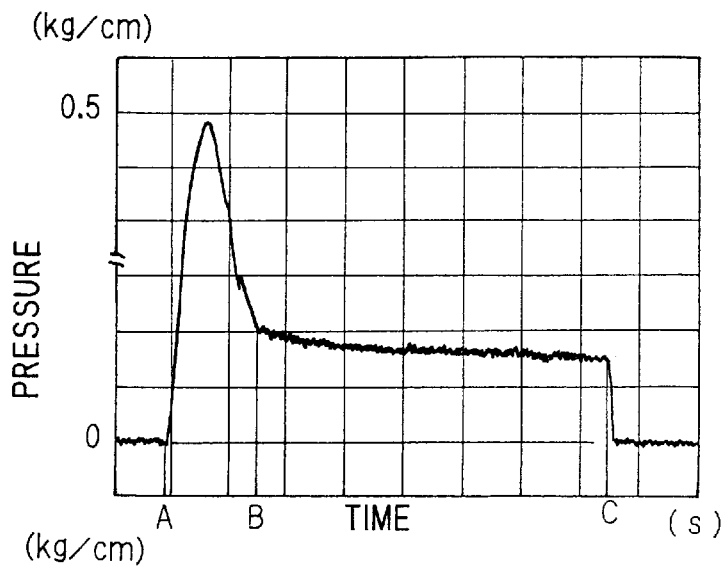
Figure 3C:
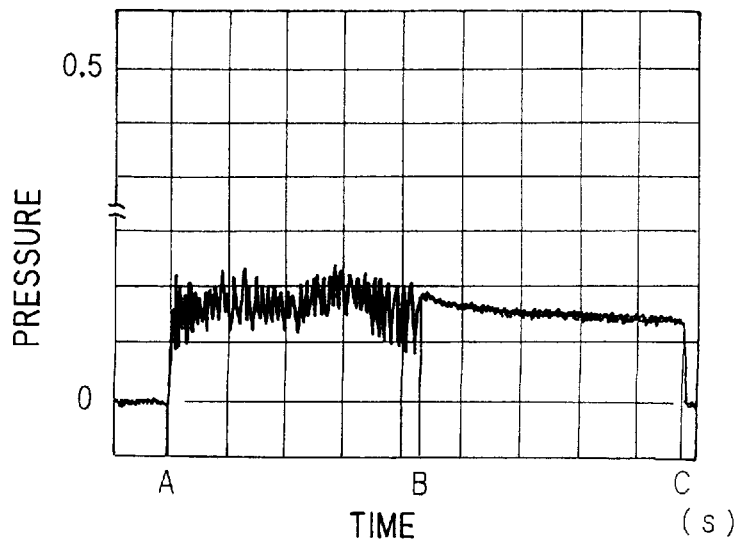

The preferred embodiments of the invention will be described in more detail with reference to the drawings.

FIG. 4 shows the constitution of the beverage extraction apparatus in the first preferred embodiment of the invention. The beverage extraction apparatus consists of extraction unit 2 for extracting the beverage from the mixture of a raw material such as coffee beans, black tea, green tea, etc. powdered to a predetermined degree of granulation and hot water, waste disposal unit for disposing the waste, and air pump 5 for supplying compressed air to each part of beverage extraction apparatus 1.

Extraction unit 2 is supported by a guide rail not shown to be movable up and down, and provided with cylinder 20 for transporting downward the mixture of the powdered raw material and hot water supplied from above. paper filter 21 for filtering the mixture supplied from cylinder 20, and beverage receiver 22 for receiving the beverage extracted by the filtration through paper filter 21. Paper filter 21 is placed under cylinder 20.

Cylinder 20 is provided with mixing chamber 20b for mixing the powdered raw material and hot water, and extraction chamber 20d for extraction of the beverage. The powdered raw material is supplied through inlet 20a provided in the upper part of mixing chamber 20b. The mixture of the powdered raw material and hot water is discharged from outlet 20c provided under extraction chamber. 20d. Mixing chamber 20b and extraction chamber 20d are communicated by way of conduit 20e. Conduit 20e is opened and closed by means of valve 23. Extraction chamber 20d has inlet 20f for introducing compressed air from air pump 5.

Paper filter 21 in the form of a roll is set on axis 21A which is rotatable, and can be unwound from the roll to the left in FIG. 4 by waste processing motor 40 in the waste processing unit. Paper filter 21 is provided with filter detecting lever 21B and filter shortage sensor 21C such as a micro-switch. Filter amount detecting lever 21B is supported to be rotatable at the proximate end and always in contact with paper filter 21 in the roll form at the distal end or in the middle portion thereof. When paper filter 21 runs short and filter amount detecting lever 21B is rotated to put filter shortage detecting sensor 21C in switching action so that a signal indicating the shortage of paper filter 21 is outputted to control unit 6 described later to be used for alarm and so on.

Beverage receiver 22 has opening 22a to which cylinder 20 is contacted in the upper part thereof. Rubber seal 22A is provided around opening 22a to prevent leakage of the mixture. At the end thereof, roller 22B is provided for changing the direction of running of paper filter 21. Beverage supply tube 22C for supplying the beverage to the serving cup portion and discharge tube 22D for discharging the beverage are provided in the lower part of beverage receiver 22. Beverage supply tube 22C is provided with diffuser 60 for separating and removing astringency and impure tastes present in the beverage extracted in extraction process, and beverage supply valve 53 for controlling open and close of beverage supply tube 22c.

Extraction unit 2 is provided with extraction motor 24, reducing unit 25 for reducing the rate of rotation of extraction motor 24 to a predetermined rate having output axes 25a and 25b projecting from either side, supporting plate 26 supporting an end of output axis 25a by bearing 26a, cylinder cam 27A and valve cam 27B fixed on output axis 25a, cylinder driving plate 28A for driving cylinder 20, valve driving plate 28B for driving valve 23, cylinder cam follower 29A fixed on cylinder driving plate 28A, valve cam follower 29B fixed on valve driving plate 28B, drawing coil spring 30 for drawing cylinder driving plate 28A and valve driving plate 28B closer to each other to come into contact with cylinder cam 27A and valve cam 27B, respectively, engaging member 28a mounted on cylinder driving plate 28A and engaging with one end of drawing coil spring 30, engaging member 28b mounted on valve driving plate 28B and engaging with the other end of drawing coil spring 30, connecting members 31A, 31B and 31C respectively connecting cylinder 20 with cylinder driving plate 28A, lever 32 connected with valve 23 rotatably by pin 32a, connecting member 33 which is mounted on valve driving plate 28B and connects lever 32 rotatably by pin 32b. engaging member 28c mounted on valve driving plate 28B, drawing coil spring 30 engaged with the proximal end of lever 32 and engaging member 28c at respective ends, waste processing motor 40, and reducing unit 41 for reducing the rate of rotation of extraction motor 24 to a predetermined rate having output axis 41a. Extraction unit 2, is so arranged to complete a series of processes including agitation process, extraction process and waste disposal process in accordance with a rotation respectively of output axes 25a, 25b and 41a.

A process regulation system for regulating the progress of each process is provided on the side having output axis 25b of reducing unit 25. In more detail, output axis 25b is provided with first, second and third process regulation plates, 35A, 35B and 35C, around which first, second and third process regulation sensors, 36A, 36B and 36C, such as photo-sensors, are provided in order to detect (for example, to output an off signal by shading light) angular positions of first, second and third process regulation plates, 35A, 35B and 35C, respectively.

Air pump 5 is connected with air pipe 52 which leads to beverage receiver 22 and inlet 20f attached to extraction chamber 20d. Air pipe 52 is provided with upper air valve 50 and T-shaped branch 54 to which air discharge valve 55 is attached, near inlet 20f of extraction chamber 20d. Lower air valve 51 operated electromagnetically is provided on air pipe 52 near beverage receiver 22.

Figure 5:
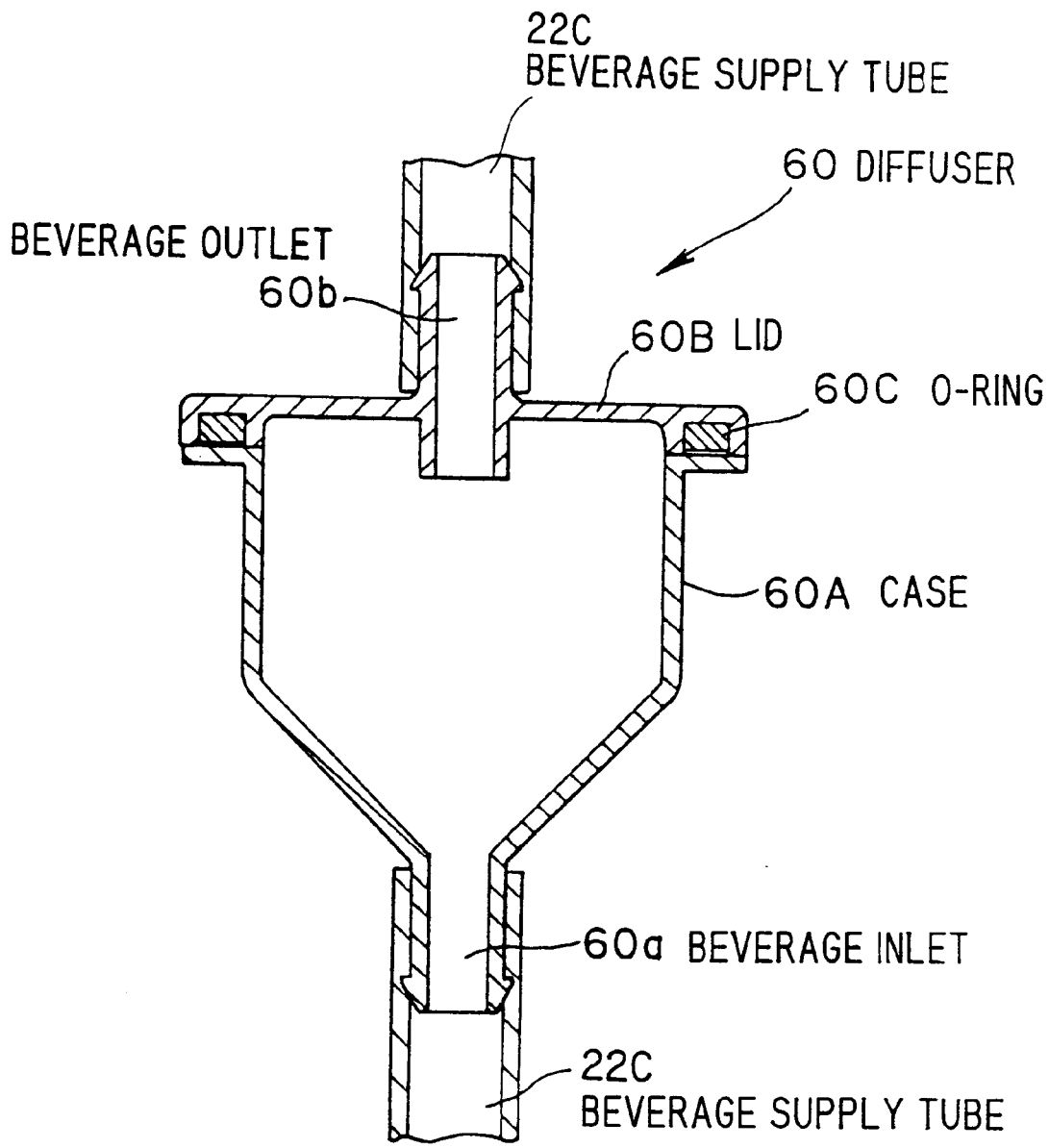
FIG. 5 is an explanatory view of the diffuser in the first preferred embodiment of the invention.

FIG. 5 shows diffuser 60 which is provided with case 60A having beverage supply inlet 60a, lid 60B having beverage outlet 60b, and O-ring 60C for preventing leakage of the beverage out of the connection between case 60A and lid 60B. Beverage supply inlet 60a is connected with supply side portion of beverage supply tube 22C and beverage outlet 60b is connected with discharge side portion of beverage supply tube 22C. Case 60 has a shape in which the cross-section is reduced toward beverage supply inlet 60a. The terminal portion of beverage outlet 60b protrudes into diffuser 60a to apredetermined length. Diffuser 60 is located above beverage supply valve 53 (electromagnetically operated) in order to ensure the discharge of beverage stored in the diffuser.

Figure 6:
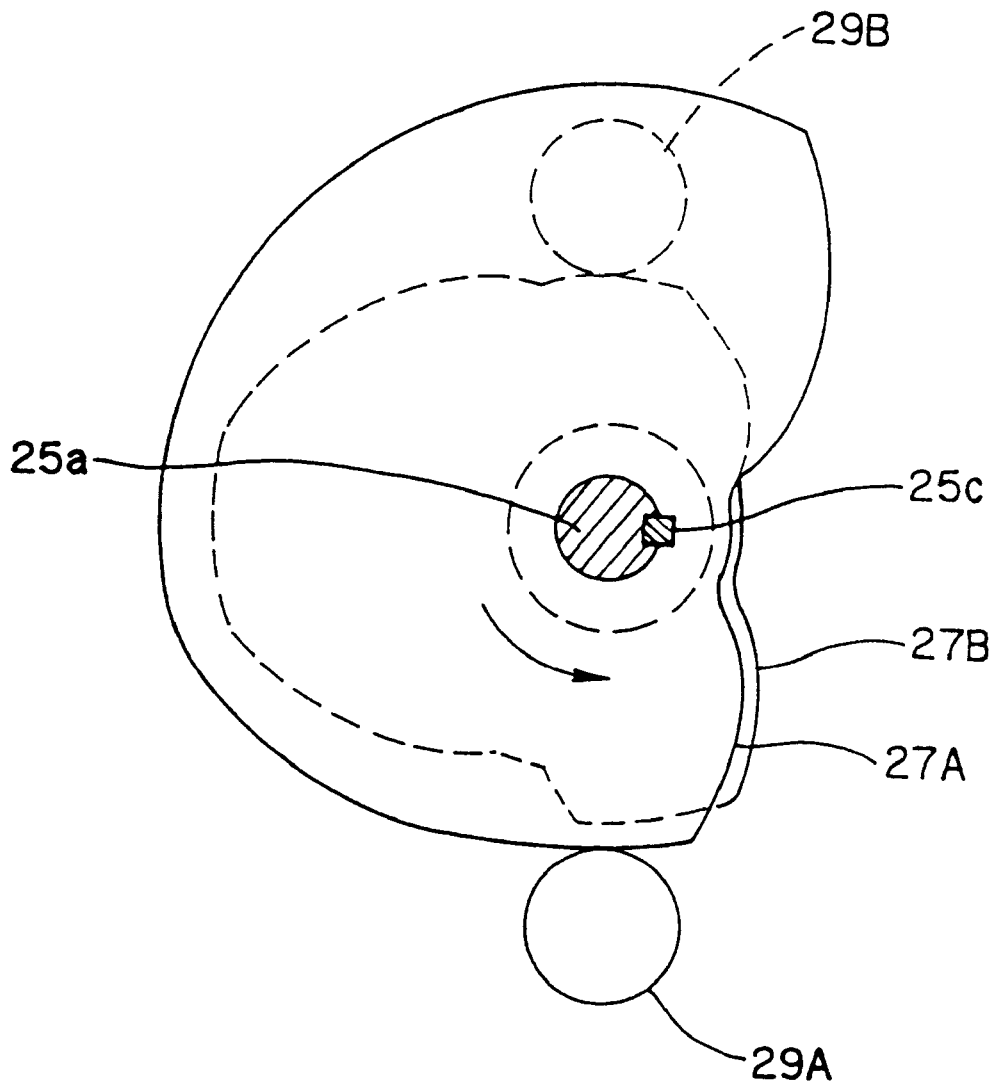
FIG. 6 is a cross-sectional view along A—A in FIG. 4.

FIG. 6 is a cross-sectional view of the apparatus shown in FIG. 4, along the plane indicated by line A—A. Cylinder cam 27A and valve cam 27B are fixed to output axis 25a of reducing unit 25 by way of key 25c. Their cam surfaces have the shapes as shown in FIG. 6.

Figure 7:
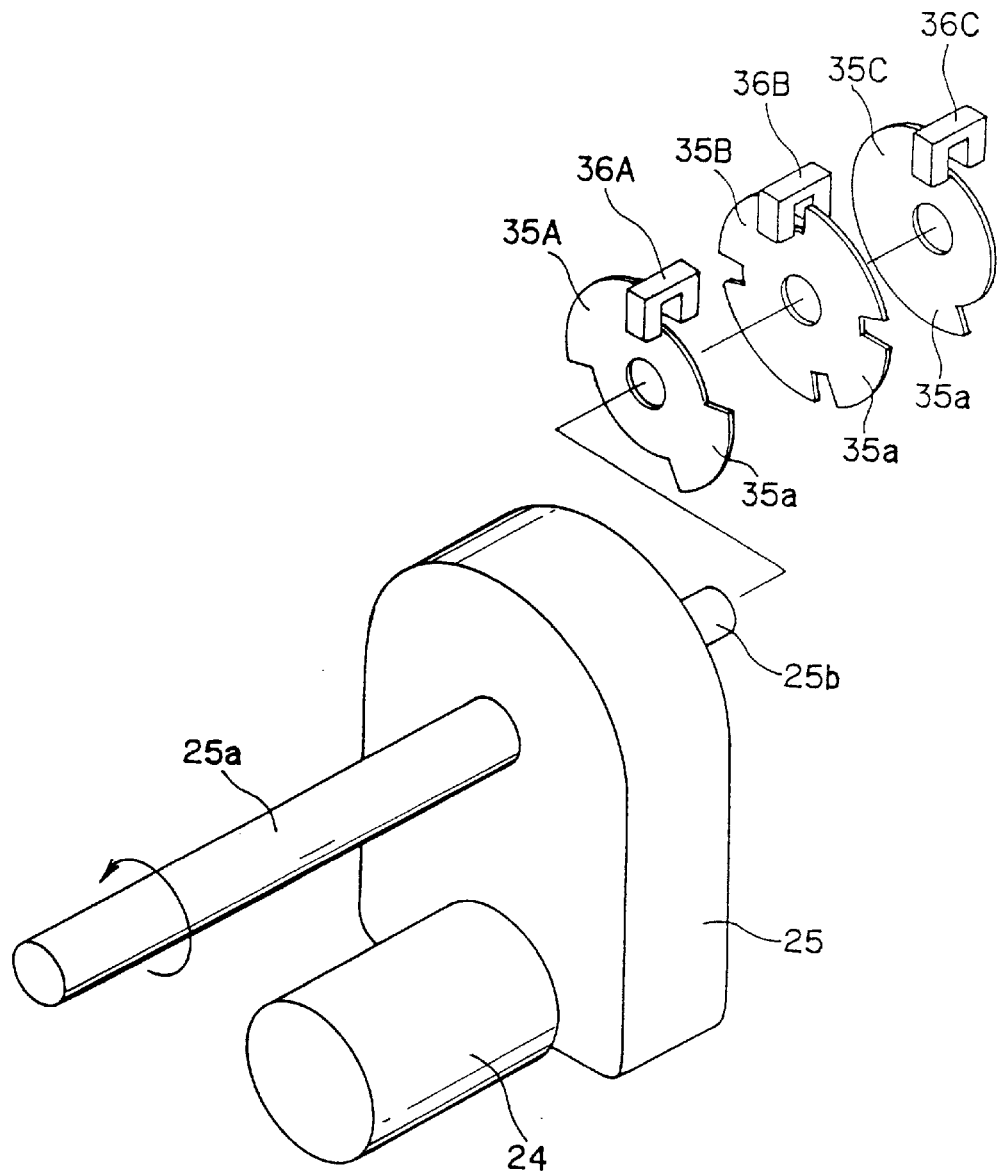
FIG. 7 is a perspective view of the process regulation system in the first preferred embodiment of the invention.

FIG. 7 is a perspective view of the process regulation system. Protrusions 35a are formed at two positions on first process regulation plate 35A, encompassing 90 degrees. Protrusions 35b are formed at four positions on second process regulation plate 35b, encompassing 70 degrees. Protrusion 35c is formed on third process regulation plate 35c, encompassing 180 degrees.

Figure 8:
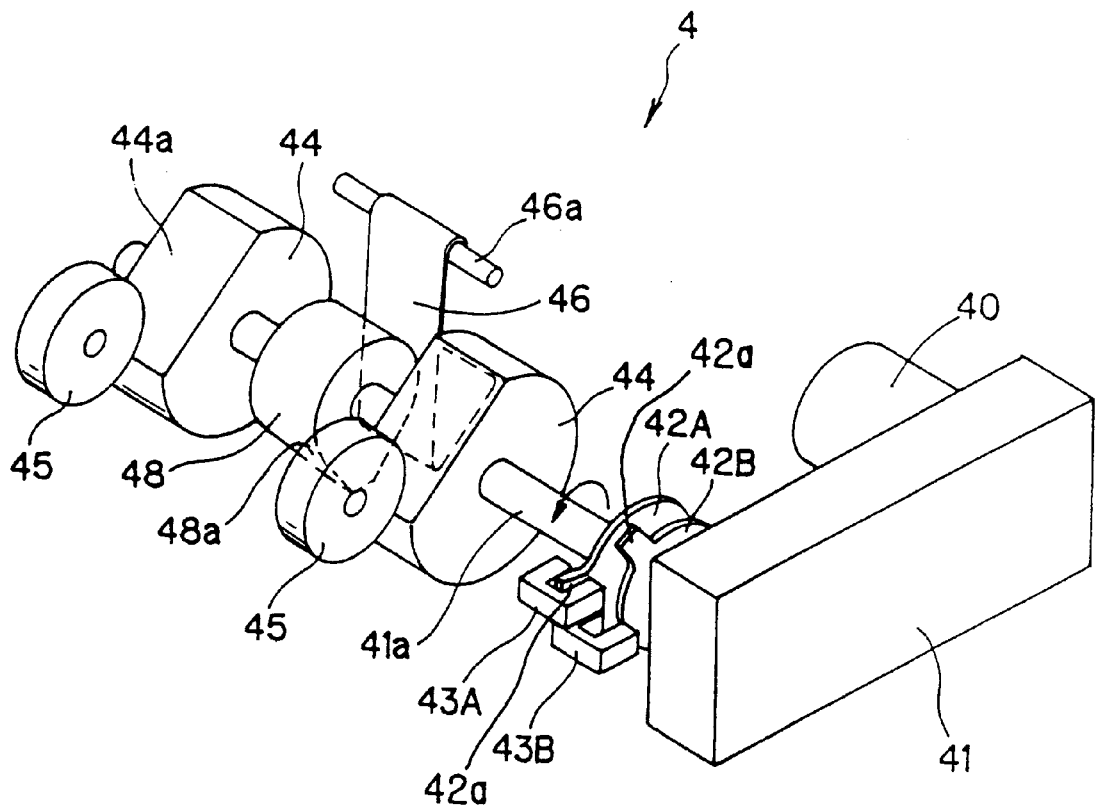
FIG. 8 is a perspective view of the waste disposal portion in the first preferred embodiment of the invention.

FIG. 8 is a brief perspective view of waste processing unit 4. Waste processing unit 4 is provided with waste processing motor 40. reducing unit 41 for reducing the rotation rate of waste processing motor 40 to a predetermined rate of rotation, drain tube opening detection plate 42A and drain tube closing detection plate 42B fixed to output axis 41a of reducing unit 41, drain tube opening detection sensor 43A, drain tube closing detection sensor 43B, a pair of filter supply rollers 44, a pair of guide rollers 45 for pressing paper filter 21 toward filter supply rollers 44, pressure plate 46 for closing drain tube 22D, and pressing cam 48 for causing pressure plate 46 to rotate. Drain tube opening detection sensor 43A is a detector such as photo sensor which outputs an off signal indicating the opened state. (stand-by state) of drain tube 22D in response to blocking of light (such as shutting off) by protrusion 42a of drain tube opening detection plate 42A. Drain tube closing detection sensor 43B is a detector such as photo sensor which outputs an off-signal indicating the closed state of drain tube 22D in response to blocking of light (such as shutting off) by protrusion 42a of drain tube closing detection plate 42B. Filter supply rollers 44 are a pair of rollers, fixed to output axis 41a, each having indentation 44a on the periphery and serve to unwind a roll of paper filter 21 to supply a predetermined length of paper filter 21. Guide rollers 45, 45 serve to press paper filter 21 toward filter supply rollers 44, 44 by means of springs not shown. Pressure plate 46 is consisting of a planar spring or the like pressing discharge tube 22D toward stationary plate 47 (refer to FIG. 4) so as to close discharge tube 22D. Pressing cam 48 is fixed to output axis 41a and has protrusion 48a on the periphery, which serves to cause pressure plate 46 to rotate.

Figure 9:
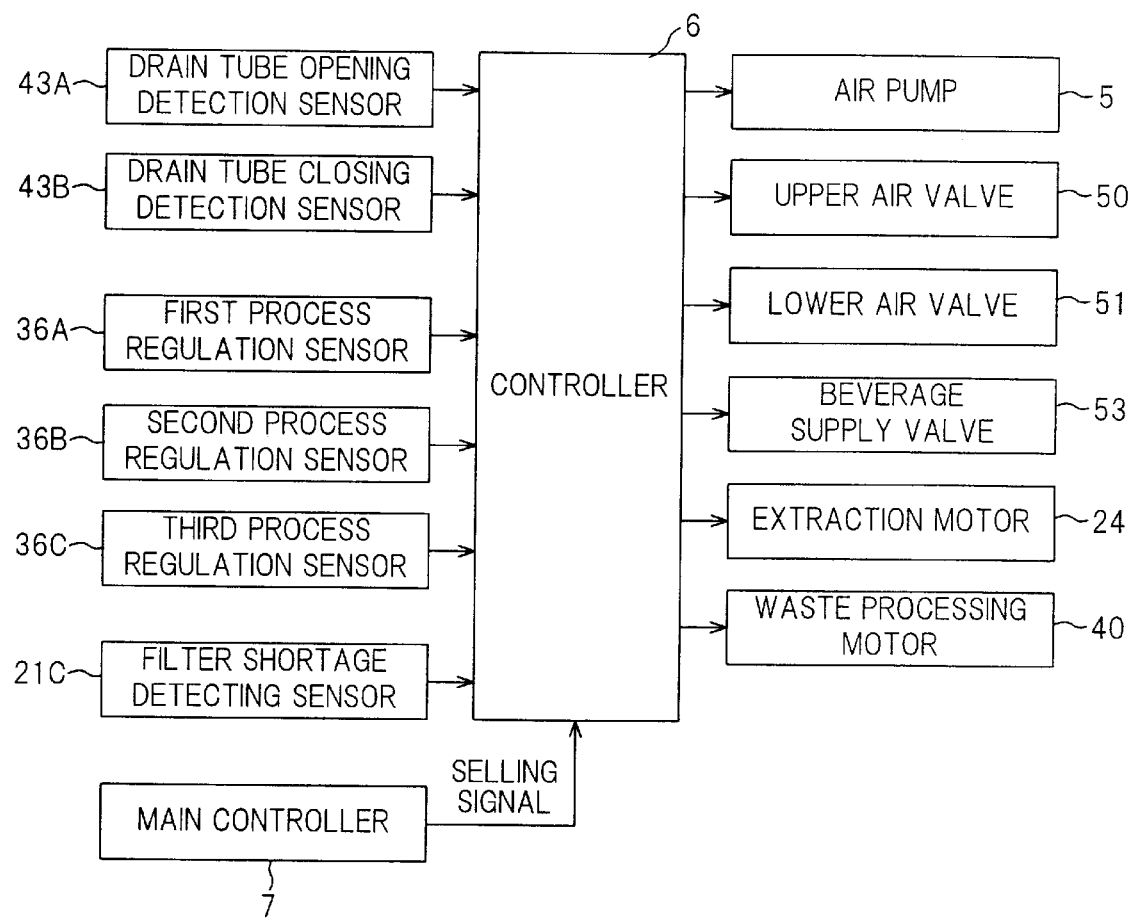
FIG. 9 is a block diagram of the control in the first preferred embodiment of the invention.

FIG. 9 is a block diagram of the control system in beverage extraction apparatus 1 according to the invention. Control system 6 serves to control each part of beverage extraction apparatus 1. with control system 6, there are connected drain tube opening detection sensor 43A, drain tube closing detection sensor 43B, first. second and third process regulation sensors 36A, 36B and 36C, respectively, filter shortage detecting sensor 21C, air pump 5, upper air valve 50, lower air valve 51, beverage supply valve 53, extraction motor 24 and waste processing motor 40, and further main control unit 7 for controlling serving of the beverage.

A serving signal is outputted from main control unit 7 to control unit 6 every time when the extracted beverage should be served. Control unit 6 to which the serving signal is inputted from main control unit 7 controls extraction motor 24, waste processing motor 40 and air pump 5 so as to proceed a series of processes including agitation process, extraction process and waste disposal process.

The operation of beverage extraction apparatus 1 will be explained with reference to FIGS. 10 to 17. FIG. 10 indicates the signals outputted from first, second and third process regulation sensors 36A, 36B and 36C, respectively. FIGS. 11A to 14A, FIGS. 11B to 14B and FIGS. 11C to 14C show the operation of beverage extraction apparatus 1. FIGS. 11A to 14A show the positions of main components (cylinder 20, valve 23, etc.) FIGS. 11B to 14B show the positions of drain tube opening detection plate 42A, drain tube closing detection plate 42B and filter supplying roller 44. FIGS. 11C to 14C show the positions of cylinder cam 27A and valve cam 27B. FIGS. 11D to 14D show the positions of first, second and third process regulation plates 35A, 35B and 35C, respectively.

(1) Stand-by State (FIGS. 11A to 11D)

In the stand-by state, main parts of beverage extraction apparatus 1 take the stand-by position P1 by FIGS. 11A to 11D. In detail, first, second and third process regulation sensors 36A, 36B and 36C, respectively, are on, drain tube opening detection sensor 43A is off, and drain tube closing detection sensor 43B is on. A slight gap is formed between filter supply roller 44 and guide roller 45, thereby paper filter 21 does not move even if filter supply rollers 44 are rotated. Pressure plate 46 is in contact with pressing cam 48 by elastic force of drain tube 22D.

(2) Agitation Process (FIGS. 10A to 10D and FIGS. 11A to 11D)

When the serving signal is outputted from main control unit 7, control unit 6 executes the operation of transfer from stand-by position P1 to agitation position P2 according to first and third process regulation sensors, 36A and 36C, being on, as long as second process regulation sensor 36B is on.

Control unit 6 causes waste processing motor 40 to rotate in the normal direction (output axis 41a rotates anti-clockwise in FIG. 12A). The driving torque of waste processing motor 40 is transmitted through reducing unit 41 to output axis 41a, which is rotated 60 degrees in the normal direction (anti-clockwise in FIG. 12A), whereby protrusion 48a of pressing cam 48 presses pressure plate 46, as shown in FIG. 12A, so that drain tube 22D is pinched between pressure plate 46 and stationary plate 47 to be closed. Drain tube closing detection sensor 43B is shaded by protrusion 42a of drain tube closing detection plate 42B to output an off-signal to control unit 6, which then allows waste processing motor 40 to stop, according to the off-signal from drain tube closing detection sensor 43B.

Then, control unit 6 allows extraction motor 24 to rotate in the normal direction (to rotate output axis 25b anti-clockwise as shown in FIG. 13D by arrows). The driving torque of extraction motor 24 is transmitted through reducing unit 25 to output axes 25a and 25b to rotate the axes in the normal direction (anticlockwise rotation of output axis 25b in FIG. 13D). The rotation of output axes 25a and 25b in the normal direction causes cylinder cam 27A and valve cam 27B to rotate in the normal direction, as shown in FIG. 13C, whereby cylinder driving plate 28A and valve driving plate 28B descend. Descending of cylinder driving plate 28A, on the one hand, allows cylinder 20 to descend by way of connecting members 31A, 31B and 31C, and thus the lower end of extraction chamber 20d presses paper. filter 21 to beverage receiver 22, thereby paper filter 21 comes into contact with beverage receiver 22. Descending of valve driving plate 28B, on the other hand, allows valve 23 to descend by way of connecting member 33 and lever 32. First process regulation sensor 36A is shaded by first process regulation plate 35A to output an off-signal to control unit 6. Then, second process regulation sensor 36B outputs an on-signal to control unit 6. On such condition, control unit 6 causes extraction motor 24 to stop according to the off signal from first process regulation sensor 36A. The main part of beverage extraction apparatus 1 takes agitation position P2 in FIG. 10 to be in the state shown in FIGS. 13A to 13D, in which second and third process regulation sensors, 36B and 36C, output on-signals to control unit 6 because they are free from shading by protrusions 35b and 35c of second and third process regulation plates 35B and 35c, respectively.

Control unit 6 executes the agitation process based on the off-signal from first process regulation sensor 36A and the on-signal from third process regulation sensor 36C, as long as process regulation sensor 36B is outputting an on-signal.

A signal requesting powdered raw material and hot water is outputted from control unit 6 to main control unit 7. Based on the control by main control unit 7, the powdered raw material and hot water are supplied to inlet 20a of mixing chamber 20b. At the same time, beverage supply valve 53 is closed, lower air valve 51 is opened and air pump 5 is driven based on the control by control unit 6. Air pump 5 supplies compressed air to beverage receiver 22 through lower air valve 51 and air pipe 52. The compressed air flows into extraction chamber 20d through paper filter 21, whereby the air bubbles agitate the mixture of powdered raw material and hot water in extraction chamber 20d. The supply of compressed air from the lower surface of paper filter 21 accelerates dissolution of the beverage component of the powdered raw material into the hot water, thereby beverage extraction is completed in a short period.

(3) Extraction Process (Refer to FIGS. 14A to 14D)

Control unit 6 drives extraction motor 24 to rotate in the normal direction after the period for agitation set by a timer elapses. The driving torque of extraction motor 24 is transmitted through reducing unit 25 to output axes 25a and 25b, whereby cylinder cam 27A and valve cam 27B are rotated in the normal direction. Because the diameter of cylinder cam 27A does not change as shown in FIG. 14C, cylinder 20 does not ascend or descend. Because valve cam 27B is increased in diameter as it is rotated, valve 23 is elevated, as shown in FIG. 12A, to close conduit 20e. Third process regulation sensor 36C is shaded by third process regulation plate 35C to output an off-signal to control unit 6. Thus, second process regulation sensor 36B outputs an on-signal to control unit 6. On such condition, control unit 6 causes extraction motor 24 to stop according to the off-signal from third process regulation sensor 36c. The main part of beverage extraction apparatus 1 takes agitation position P3 in FIG. 10, to be in the state shown in FIGS. 14A to 14D. In this state, first and second process regulation sensors, 36A and 36B, output on-signals.

Control unit 6 executes the extraction process based on the on-signal from first process regulation sensor 36A and the off-signal from third process regulation sensor 36C, as long as second process regulation sensor 36B is outputting an on-signal.

Upper air valve 50 is opened, lower air valve 51 is closed. beverage supply valve 53 is opened and air pump 5 is operated based on the control by control unit 6. Air pump 5 supplies compressed air through air pipe 52 to extraction chamber 20d through inlet 20f attached thereto. The mixture in extraction chamber 20d is transported downward by the compressed air from air pump 5 and filtered by paper filter 21. The beverage filtered by paper filter 21 is supplied to the serving cup portion through beverage receiver 22 and beverage supply tube 22C. The compressed air supplied to extraction chamber 20d increases the pressure therein so as to press down the mixture toward paper filter 21, whereby the mixture is separated to the beverage and the waste in a short period, the efficiency of extraction being improved.

Figure 15:
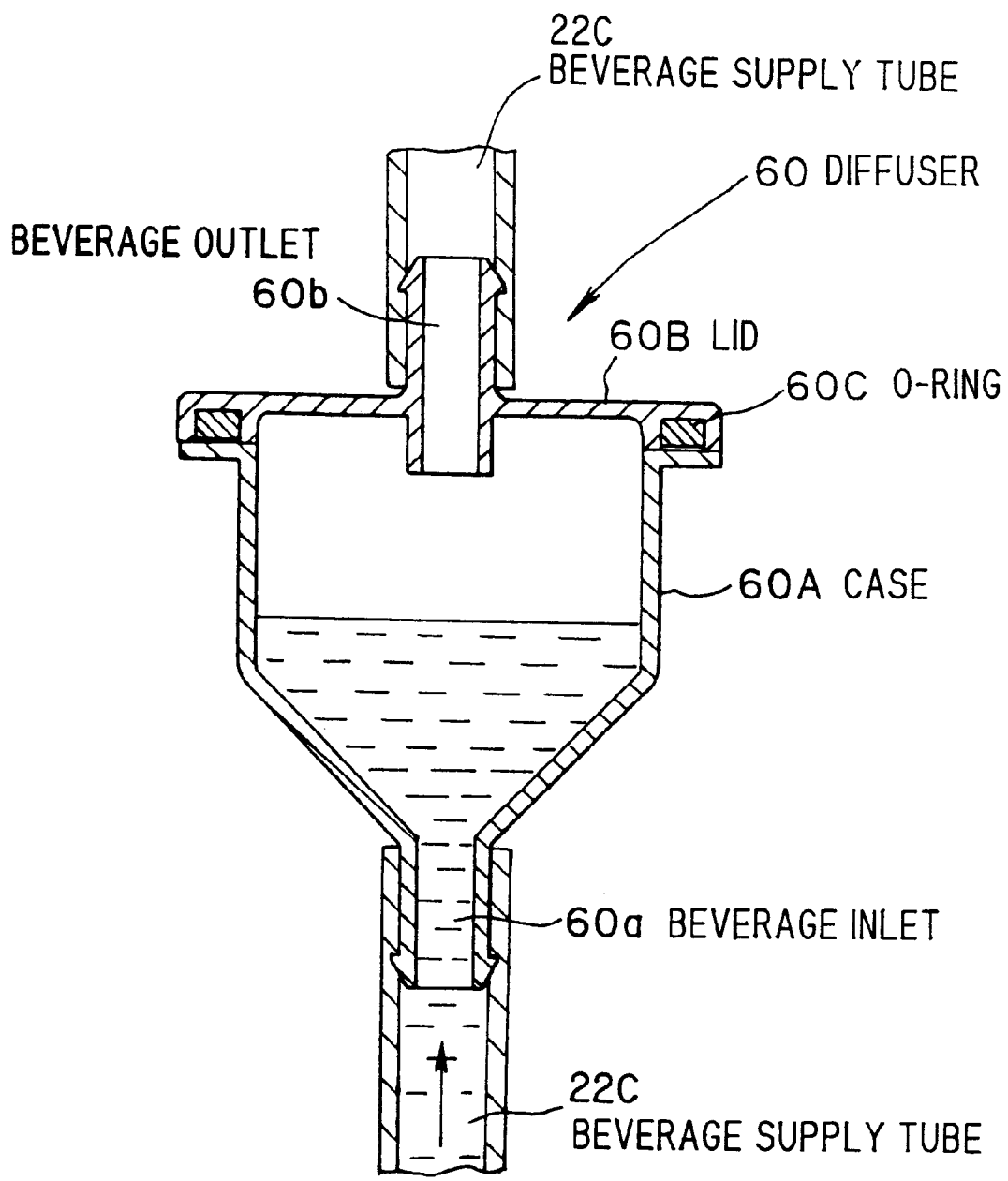
FIG. 15 is an explanatory view showing the beverage supplied to the diffuser.

FIG. 15 shows diffuser 60 at the start of extraction. The filtered beverage flows into case 60A from beverage inlet 60a connected with the supply side portion of beverage supply tube 22C. As the beverage flows into case 60A, the liquid surface in diffuser 60 is elevated.

Figure 16:
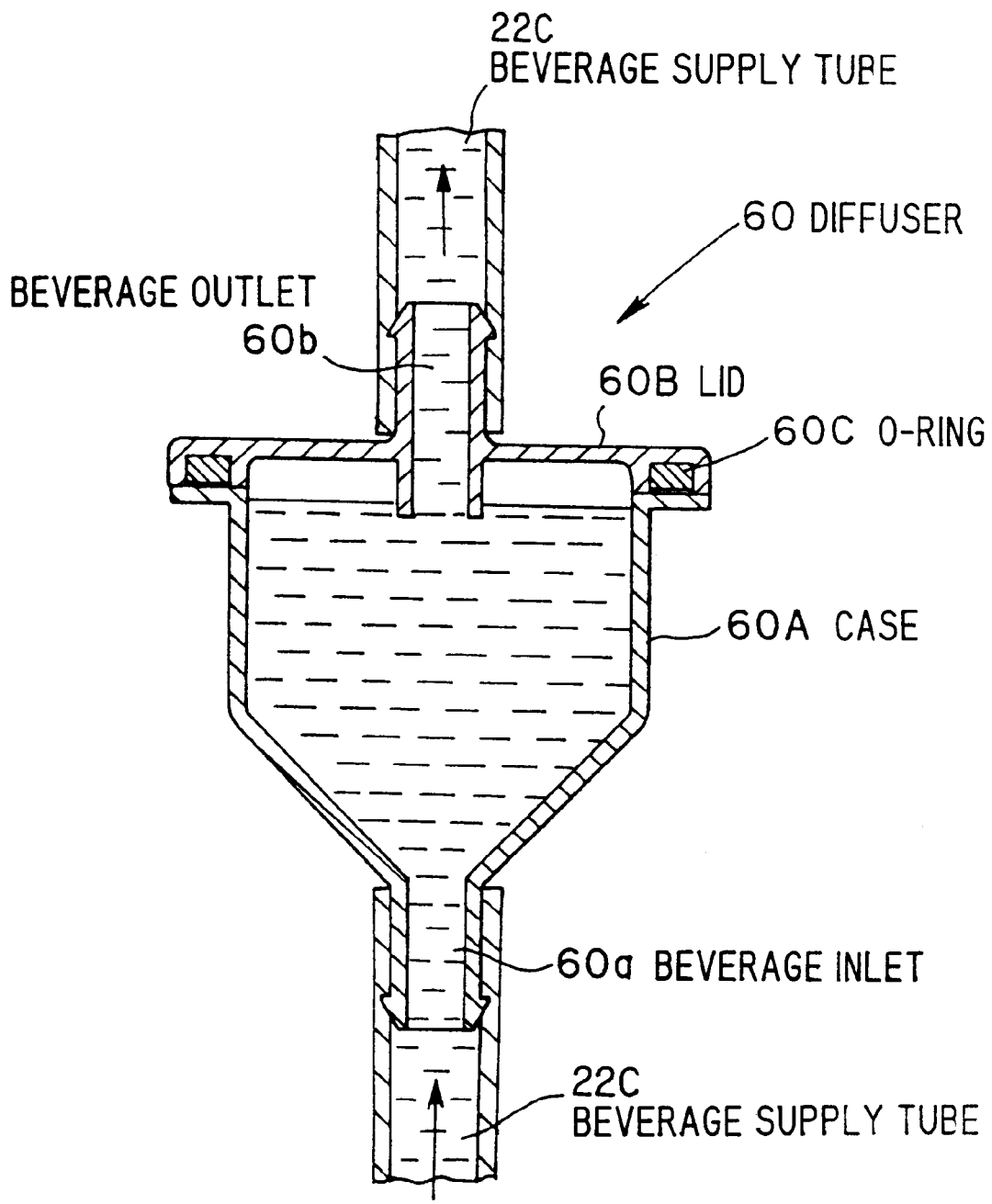
FIG. 16 is an explanatory view showing the beverage supplied to the diffuser.

FIG. 16 shows the beverage flowing out of diffuser 60. When the surface of the beverage stored in diffuser 60 reaches the lower end of beverage outlet 60b projecting into the inside of diffuser 60 from lid 60d, the beverage near the surface flows out of beverage outlet 60b into the discharge side portion of beverage supply tube 22C.

Figure 17:
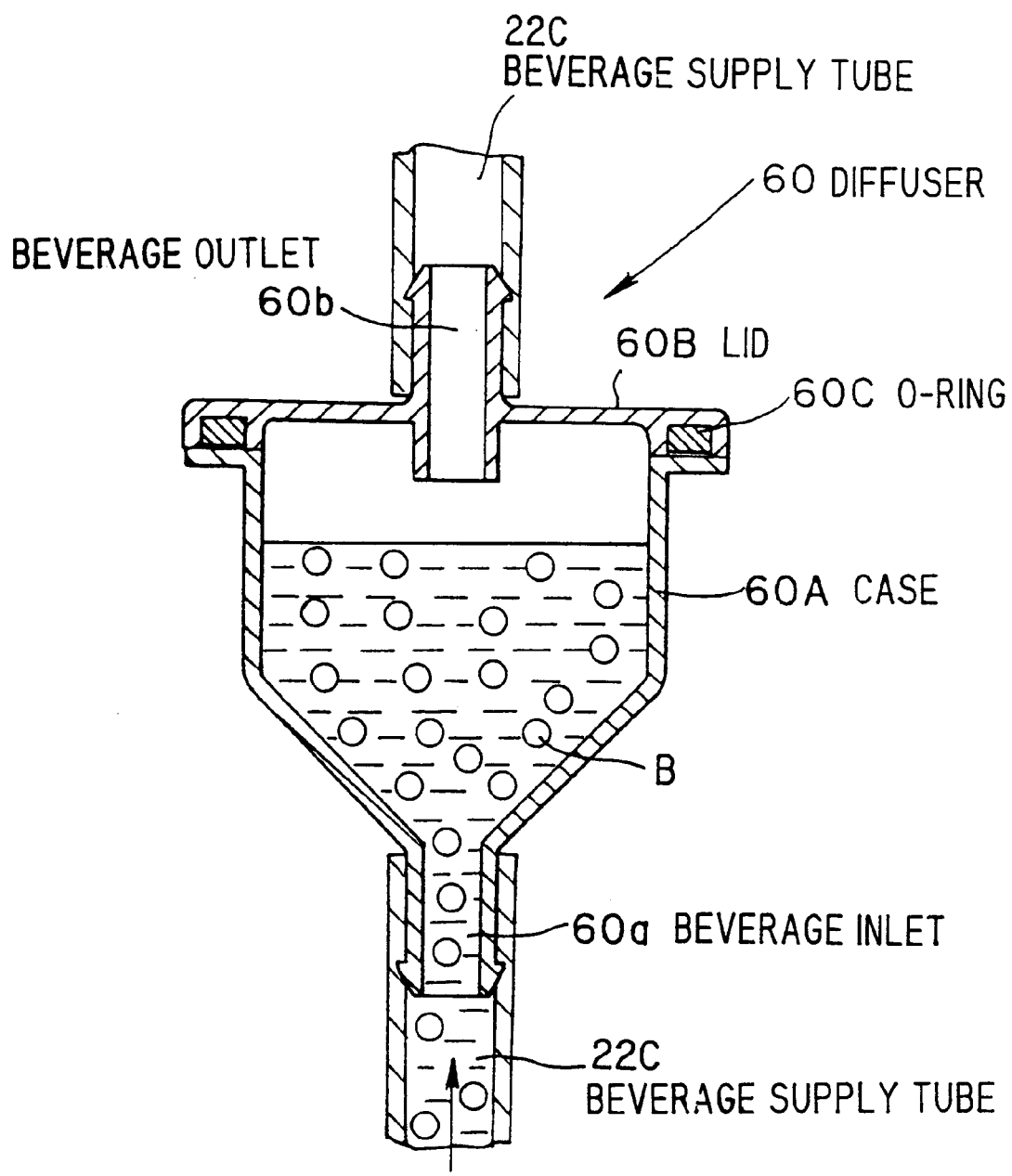
FIG. 17 is an explanatory view showing the beverage supplied to the diffuser.

FIG. 17 shows diffuser 60 after the finish of extraction. After the filtration of the mixture in extraction chamber 20d is finished, air blow is conducted to remove the beverage from beverage supply tube 22C and the beverage mixed with air bubbles flows into diffuser 60. As the air blow is carried out by supplying compressed air from inlet 20f on extraction chamber 20d, the waste of powdered raw material deposited on paper filter 21 is pressed so that the beverage containing astringency and impure tastes is squeezed out. Air bubbles B contained in the beverage is separated from the beverage in diffuser 60 and transported into the discharge side portion of beverage supply tube 22C by way of beverage outlet 60b on lid 60B. Owing to the structure of diffuser 60, a predetermined amount of the beverage is held in diffuser 60 and the supply side portion of beverage supply tube 22C.

(4) Waste Disposal Process (Refer to FIGS. 18A to 18D and FIGS. 19A to 19D.)

After the period for extraction set by the timer elapses, control unit 6 allows extraction motor 24 to rotate in the normal direction. The driving torque of extraction motor 24 is transmitted through reducing unit 25 to output axes 25a and 25b to rotate these axes in the normal direction. Owing to the rotation of output axis 25a, cylinder cam 27A and valve cam 27B rotate in the normal direction (as shown in FIG. 18C) to elevate cylinder driving plate 28A and valve driving plate 28B, respectively, causing cylinder 20 and valve 23 to ascend to the respective uppermost positions following to the rotation of output axis 25b, first and third process regulation sensors, 36A and 36C, are shaded by first and third process regulation plates 35A and 35C. respectively, as shown in FIG. 18D, to output an off-signal to control unit 6. Then, second process regulation sensor 36B outputs an on-signal to control unit 6. On such a condition, control unit 6 causes extraction motor 24 to stop according to the off signals from first and third process regulation sensors, 36A and 36C. The main part of beverage extraction apparatus 1 takes waste disposal Position P4 in FIG. 10 to be in the state shown in FIGS. 18A to 18D, in which second process regulation sensor 36B outputs an on-signal, and residue M of the powdered raw material is left on paper filter 21.

Control unit 6 executes the beverage draining and the waste disposal process based on the off-signals from first process regulation sensor 36A and third process regulation sensor 36C, as long as an on-signal is outputted from second process regulation sensor 36B.

Control unit 6 drives waste processing motor 40 in the normal direction. The torque of waste processing motor 40 is transmitted through reducing unit 41 to output axis 41a (refer to FIG. 8), which is rotated in the normal direction, whereby filter supply rollers 44 are rotated to unwind the roll of paper filter 21. When paper filter 21 having residue M thereon passes roller 22B, residue M is folded and separated from paper filter 21 (as shown in FIG. 19A by an imaginary line) and falls into a waste bucket (not shown). Drain tube opening sensor 43A is shaded by drain tube opening detection plate 42A (as shown in FIG. 19B) so as to output an off-signal to control unit 6.

Control unit 6 causes waste disposal motor 40 to stop based on the off-signal from drain tube opening sensor 43A, and beverage supply valve 53 to open, whereby the beverage containing astringency and impure tastes kept in diffuser 60 and in the supply side portion of beverage supply tube 22C is drained through drain tube 22D (refer to FIG. 4). The main part of beverage extraction apparatus 1 is in the state shown in FIGS. 19A to 19D.

FIG. 20 shows diffuser 60 in the waste disposal process. The beverage which contains astringency and impure tastes is drained through the supply side portion of beverage supply tube 22C by opening of beverage supply valve 53.

In the beverage extraction apparatus in the preferred embodiment above having diffuser 60 on beverage supply tube 22C for transporting the beverage, astringency and impure tastes squeezed from the deposited raw material can be removed from the beverage because air bubbles contained in the beverage are separated exclusively from the beverage upon passing through diffuser 60 by the air blow carried out after the extraction is finished and, after the air blow, the beverage containing astringency and impure tastes kept in diffuser 60 is drained through drain tube 22D because beverage supply valve 53 is opened.

The invention is not limited to the preferred embodiment above, but there are various other embodiments available. For instance, in place of providing diffuser 60 on beverage supply tube 22C, the beverage in the final stage of filtration may be drained through drain tube 22D by controlling the timings of open and close of beverage supply valve 53, air blow being applied to beverage supply tube 22C in separate process. Alternatively, appropriate shapes of diffuser 60 may be chosen according to the kind of powdered raw materials and the quantity of drained beverage. In addition, an encoder of absolute value type may be used as a sensor for regulating any of the processes.

According to the preferred embodiment of beverage extraction apparatus above, air bubbles introduced into the extracted beverage in the final stage of filtration are separated, inside of the beverage supply tube is blown by the separated air, and the remaining liquid is drained through the drain tube, whereby astringency and impure tastes in the beverage can be minimized, without lowering the rate of extraction from the mixture of powdered raw material and hot water.

FIG. 21 shows the beverage extraction apparatus in the second preferred embodiment of the invention. Beverage extraction apparatus 91 in the second preferred embodiment is not provided with diffuser 60 but provided with electrode unit 70, differing from that in the first preferred embodiment (FIG. 4) but otherwise being similar thereto. Thus, in the following description, the points different from the first embodiment are explained but description of the points similar thereto are omitted to avoid duplication of the description (same also for the third to seventh preferred embodiments).

Figure 22:
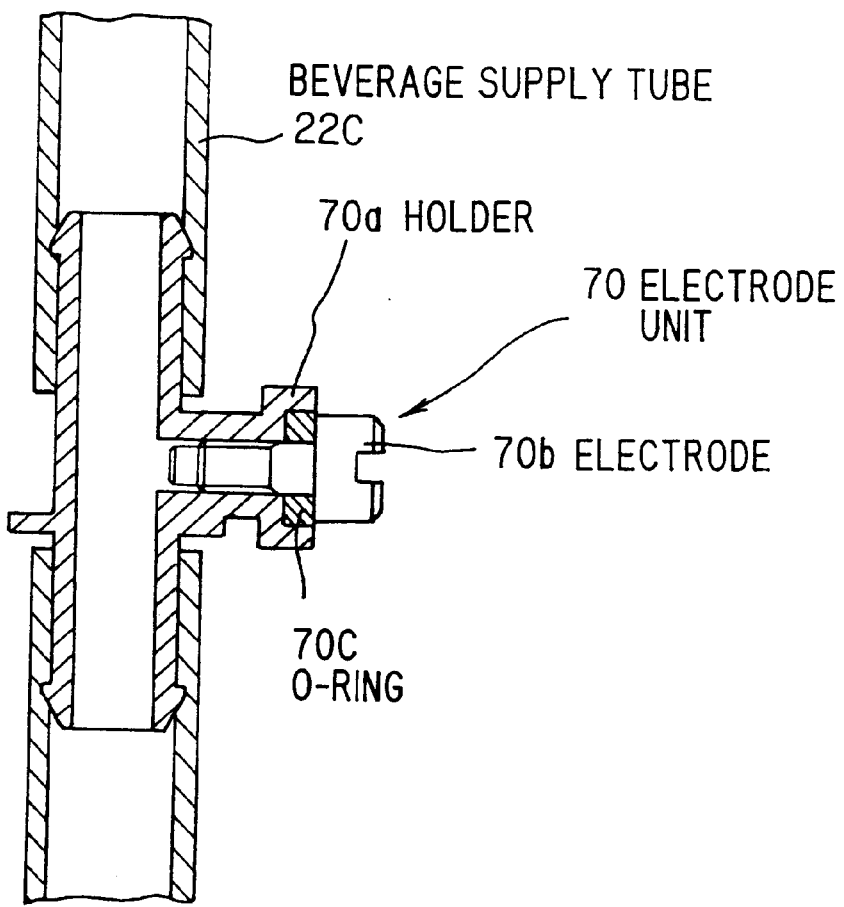
FIG. 22 is an explanatory view of the electrode unit in the second preferred embodiment of the invention.

FIG. 22 shows electrode unit 70. Electrode unit 70 consists of electrode 70b which is screw-engaged with holder 70a having T-shaped cross-section by way of O-ring 70c. Electrode 70b is connected with control unit described later.

Figure 23:
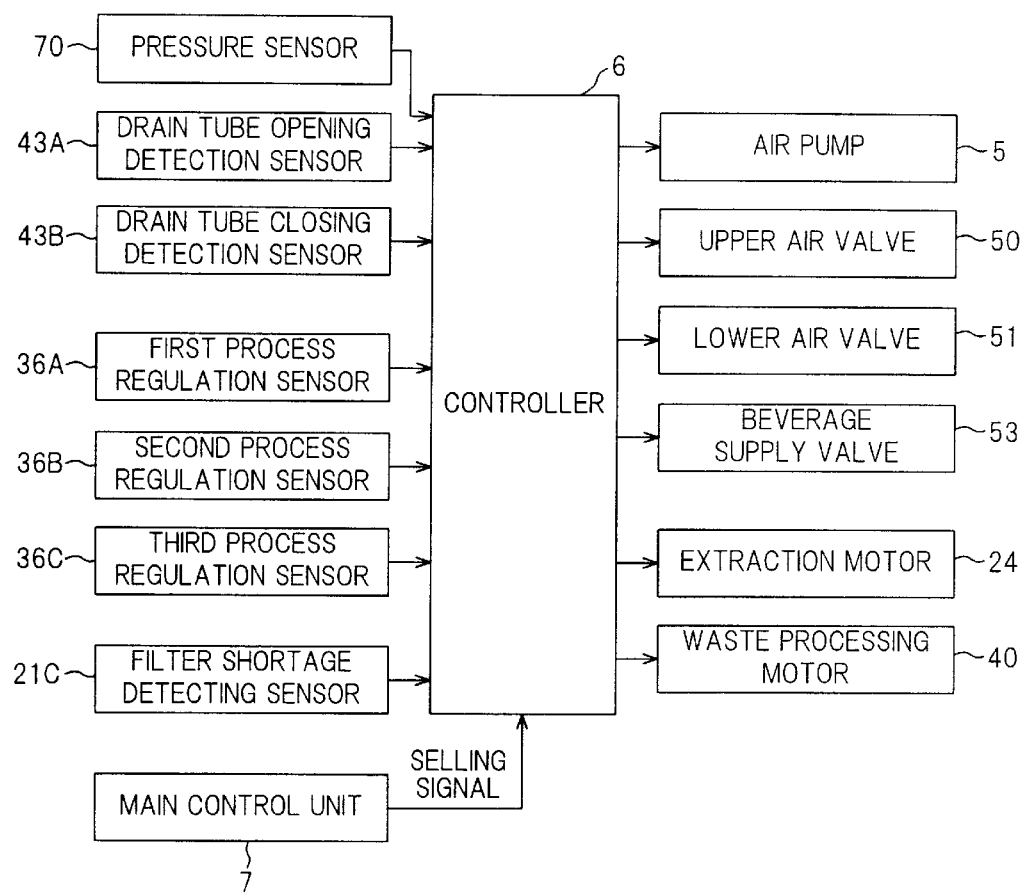
FIG. 23 is a block diagram of the control system in the second preferred embodiment of the invention.

FIG. 23 is a block diagram of the control system in beverage extraction apparatus 91. Control unit 6 for controlling each portion of beverage extraction apparatus 91 is connected with electrode unit 70, drain tube opening detection sensor 43A, drain tube closing detection sensor 43B, first, second and third process regulation sensors 36A, 36B and 36C, respectively, filter shortage detecting sensor 21C, air pump 5, upper air valve 50, lower air valve 51, beverage supply valve 53. extraction motor 24 and waste processing motor 40, and further with main control unit 7 for controlling the serving of extracted beverage.

When a signal for serving extracted beverage is outputted from main control unit 7, extraction motor 24, waste processing motor 40 and air pump 5 are controlled by control unit 6 to execute a series of processes for the beverage extraction, including agitation process, extraction process and waste disposal process, as shown in FIG. 12 to 14, FIG. 18 and FIG. 19.

Figure 24:
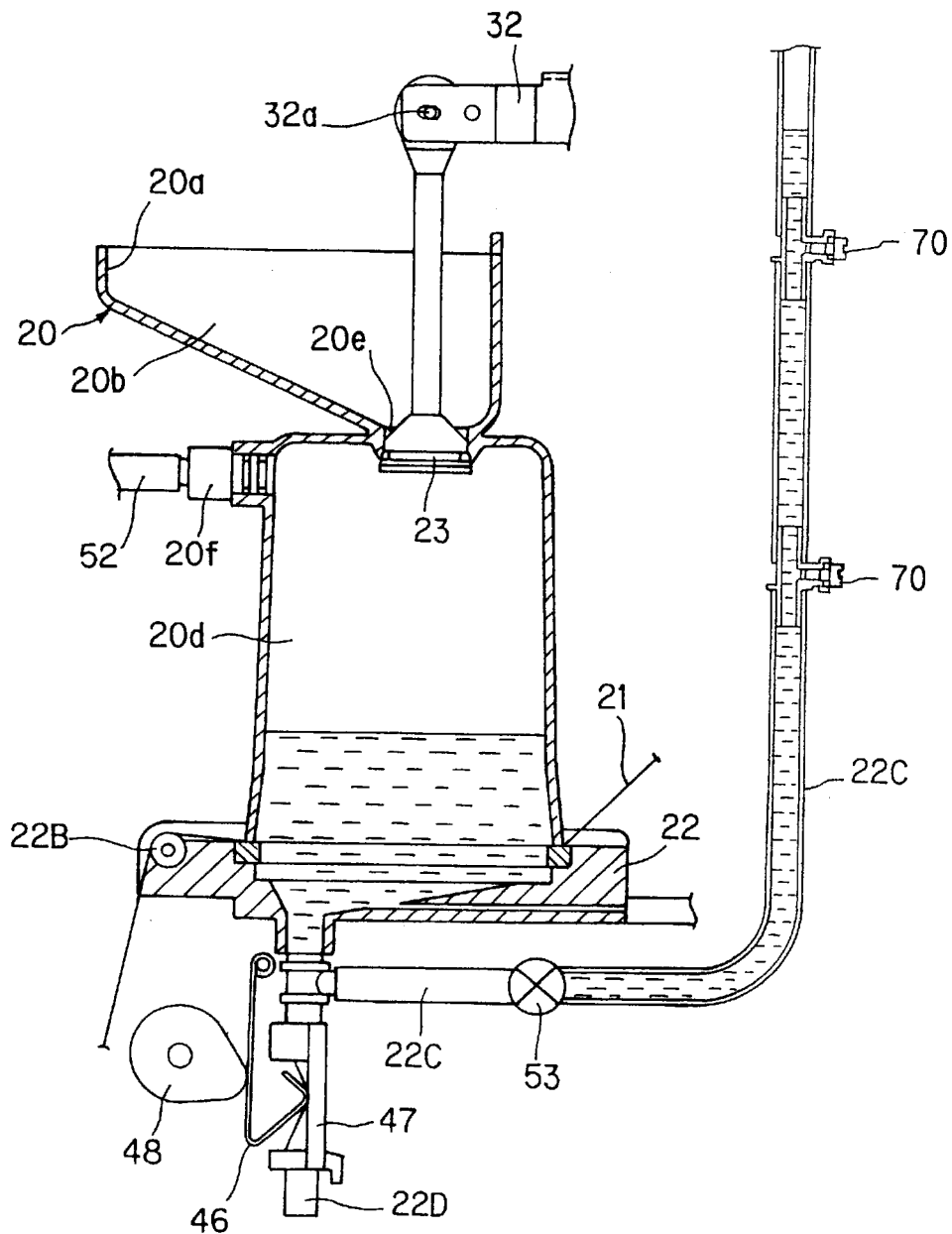
FIG. 24 is a cross-sectional view of the beverage supply tube in the second preferred embodiment of the invention.

FIG. 24 shows beverage extraction tube 220 at the start of extraction. Electric conduction is produced between neighboring electrode units 70, 70 by the beverage passing beverage supply tube 22C, reducing the resistance between the electrodes to generate some voltage. The presence and absence of the beverage in beverage supply tube 22C are detected by detecting the change in the voltage. Just before the completion of filtration of the mixture, foaming of the beverage is caused in beverage supply tube 22C. When the filtration is completed, beverage supply tube 22C is empty so that the resistance between the electrodes is increased. When the change in voltage is detected, upper air valve 50 is closed (FIG. 21).

Figure 25:
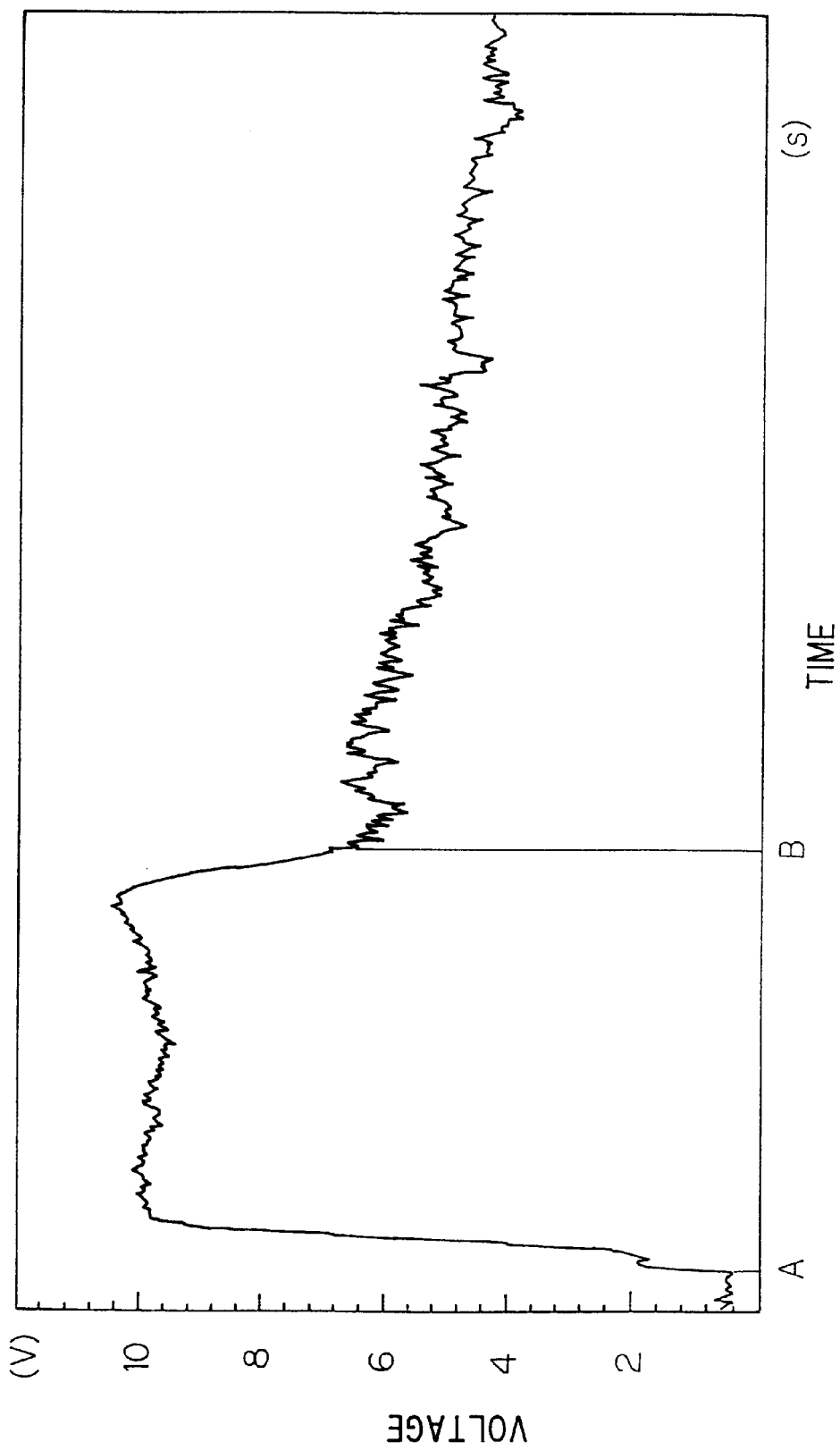
FIG. 25 is an explanatory view showing the change in the voltage between the electrodes in the second preferred embodiment of the invention.

FIG. 25 shows the change in the voltage between the two electrodes 70, 70 provided on beverage supply tube 22C. At time A after the extraction is started, the beverage filtered passes beverage supply tube 22C, thereby the resistance between the electrodes is reduced, resulting in the in cream of the voltage.

At time B, most of the soluble component is filtered and the foams of the beverage are produced, the resistance between the electrodes increases to lower the voltage, and later the resistance is slightly increased as the foams decrease.

According to the preferred embodiment of beverage extraction apparatus of the invention, electrode units 70 are provided on beverage supply tube 22C transporting the beverage so as to detect the presence and absence of the beverage, and the supply of compressed air is stopped at the time point when the voltage decreases suddenly, whereby no useless time is taken for filtration and the beverage is prevented from astringency and impure tastes squeezed out from the deposited raw material.

Figure 26:
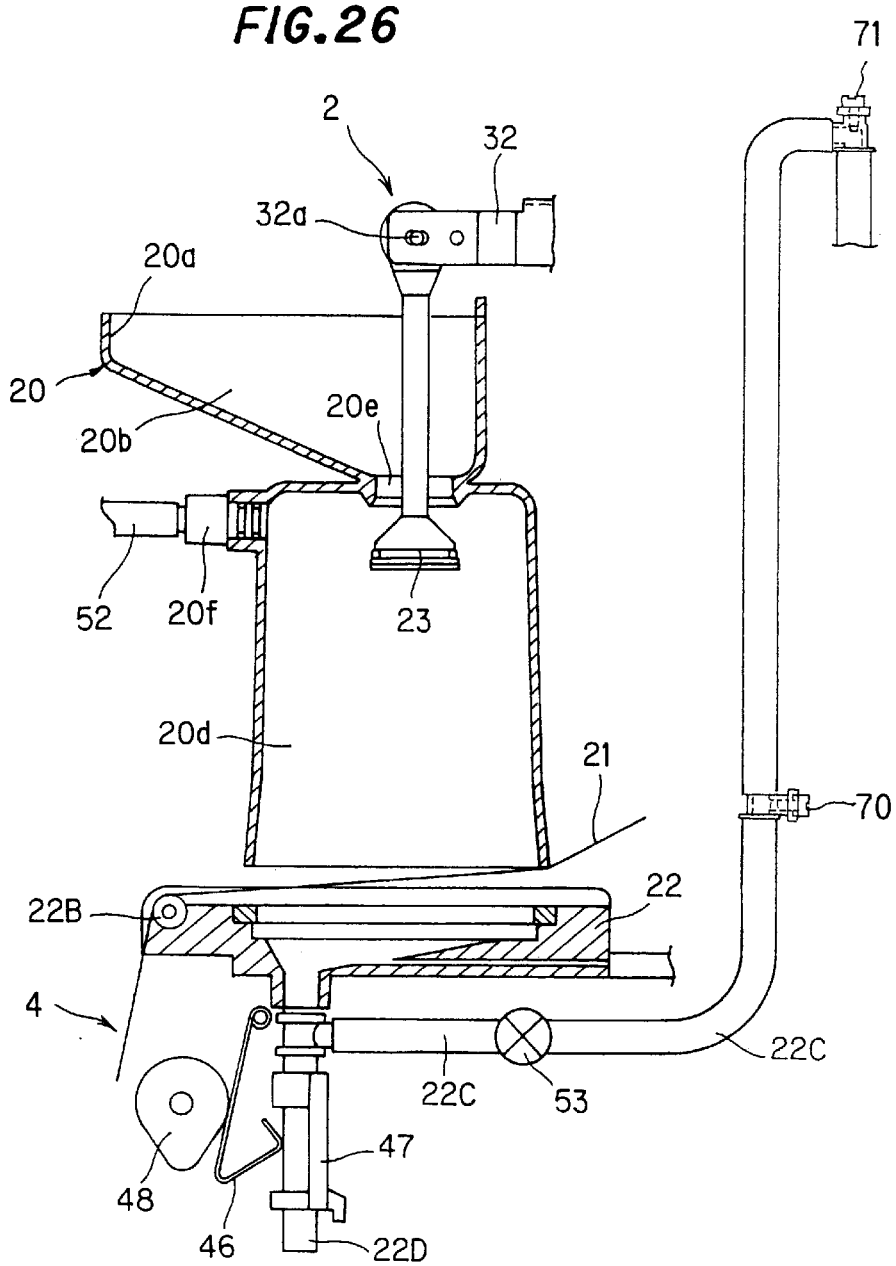
FIG. 26 is an explanatory view of the beverage extraction apparatus in the third preferred embodiment of the invention.

FIG. 26 shows the third preferred embodiment of beverage extraction apparatus according to the invention. The beverage extraction apparatus is provided with electrode unit 70 on beverage supply tube 22C and electrode unit 71 placed at the uppermost position of beverage supply tube 22C, downstream of electrode unit 70. In FIG. 26, extraction unit 2 and waste processing unit 4 shown in the first and second embodiments are shown briefly.

Figure 27:
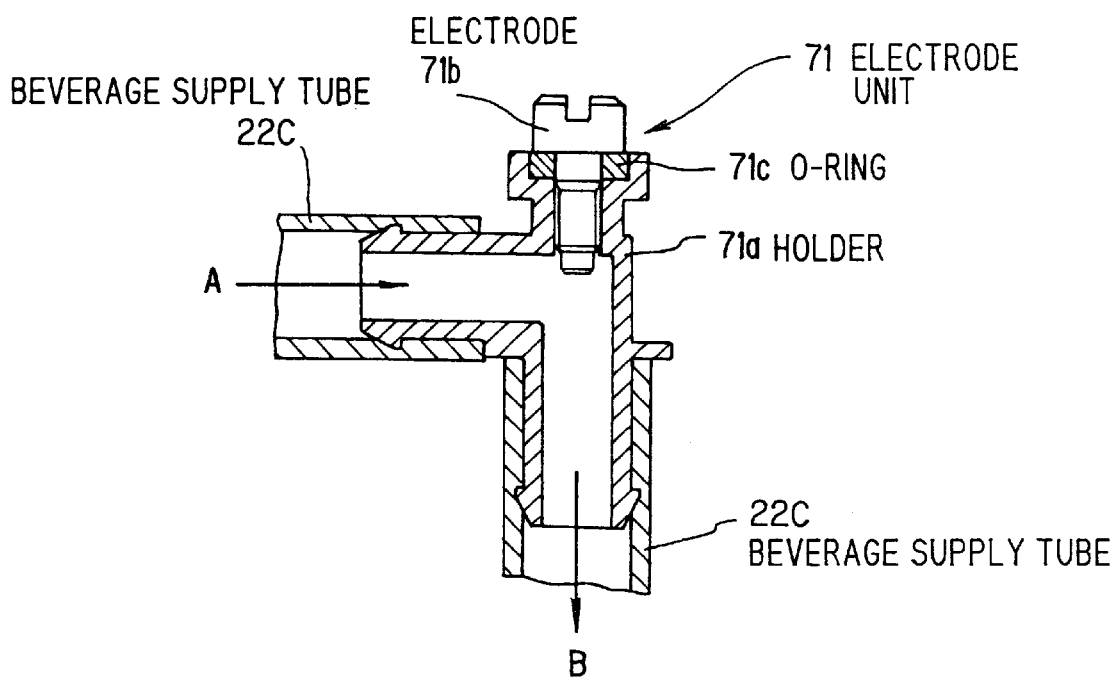
FIG. 27 is an explanatory view of the electrode unit in the third preferred embodiment of the invention.

FIG. 27 shows electrode unit 71, which consists of electrode 71b in screw-engagement with holder 71a in L-shape by way of O-ring 71c. Holder 71a is fixed on beverage supply tube 22C so that the portion on the supply side is positioned horizontally and the portion on the discharge side is directed vertically. Electrode 71b is located on the extension of the vertical portion of holder 71a, projecting from the inner wall of holder 71a.

In the constitution above, conduction between electrode units 70 and 71 is caused by the beverage passing through beverage supply tube 22C. In electrode unit 71, the beverage flowing thereinto horizontally comes into contact with electrode 71b just before flowing out on the discharge side of beverage supply tube 22C, causing the flow of beverage in holder 71a. Thereby, the flow of beverage in beverage supply tube 22C can be detected.

FIG. 28 shows the constitution of beverage extraction apparatus in the fourth preferred embodiment of the invention. Beverage supply tube 22C is provided with a plurality of electrode units 70A, 70B, 70C and 71. In the beverage extraction apparatus, the first detecting section is formed by electrode units 70A and 70B to detect the presence and absence of the beverage, and the second detecting section is formed by electrode units 70C and 71 to detect the flow of the beverage.

FIG. 29 and FIG. 30 show the state of conduction between the electrodes and the state of filtration, respectively, in the fourth preferred embodiment.

FIG. 29 shows the state in which the filtered beverage stays in beverage supply tube 22C, where there is conduction in the first detecting section and no conduction in the second detecting section. In the case where the mixture of the powdered raw material and hot water is filtered under a low pressure, as in batch extraction, the compressing force is lowered accidentally depending on the amount of powdered raw material or due to the air lead from the cylinder. The absence of flow of the beverage around or downstream of electrode unit 71 due to insufficient pressure for filtration is judged when the conduction is observed in the first and second sections after the filtration is started and, thereafter, there is no conduction only in the second detecting section.

FIG. 30 shows the state in which the filtered beverage flows normally through beverage supply tube 22C, where there is conduction in either of the first and second detecting sections.

FIG. 31 shows the state in which the filtration is completed, where there is almost no conduction in the first detecting section but conduction is observed in the second detecting section. In the first detecting section, then, there is slight conduction when the foaming beverage arising at the finish of filtration flows therein, but no conduction after the foaming beverage is driven off downstream.

FIG. 32 shows the state in which the filtration is completed and the beverage in beverage supply tube 22C is driven downstream of electrode unit 71. Smooth flowing of the beverage downstream of electrode unit 71 is judged by the absence of conduction in the first and second detecting sections.

Figure 33:
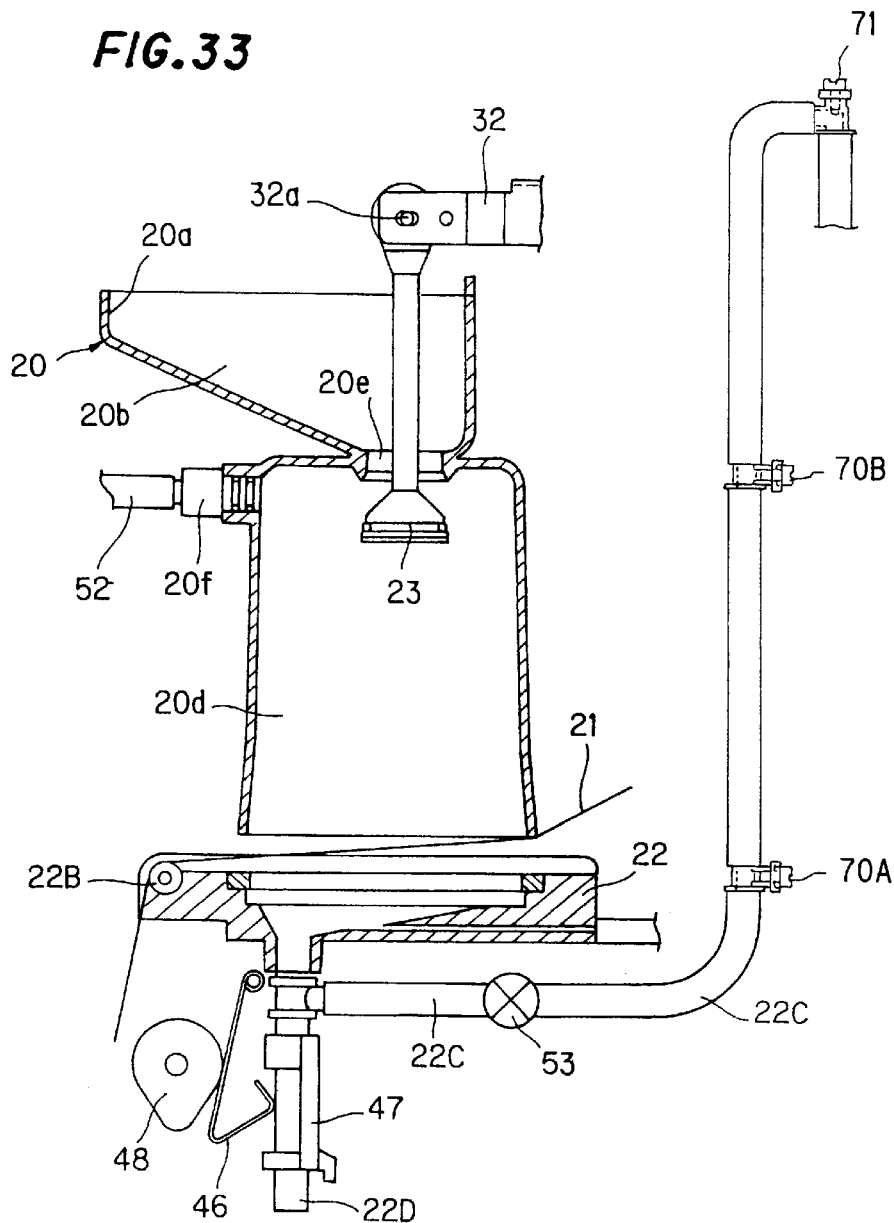
FIG. 33 is an explanatory view of the beverage extraction apparatus in the fifth preferred embodiment of the invention.

FIG. 33 shows the constitution of beverage extraction apparatus in the fifth preferred embodiment of the invention. In the beverage extraction apparatus, electrode unit 70B provided on beverage supply tube 22C is utilized as the common electrode for the first and second detecting sections. Taking advantage of the constitution, the number of electrodes, thus the cost, can be reduced.

As described in the foregoing, in the second to fifth preferred embodiments of beverage extraction apparatus according to the invention, filtration of the beverage is controlled based on the detection signal outputted according to either the presence and absence or the flow of the beverage in the beverage supply tube, thereby defective filtration is prevented and a beverage with high quality can be produced by extraction. In addition, the beverage passing through the beverage supply tube is detected based on the change in the resistance between the pair of electrodes, whereby the state of filtration can be detected precisely even in the filtration under low pressure such as in batch extraction. Moreover, either the presence and absence of the beverage or flow of the beverage can be detected according to the positions of the electrodes on the beverage supply tube, enabling detection of the abnormality in filtration pressure.

FIG. 34 shows the constitution of beverage extraction apparatus in the sixth preferred embodiment of the invention. Between upper air valve 50 and air inlet 20f, branch 59 is provided leading to pressure sensor 80 detecting the pressure within extraction chamber 20d.

Figure 35:
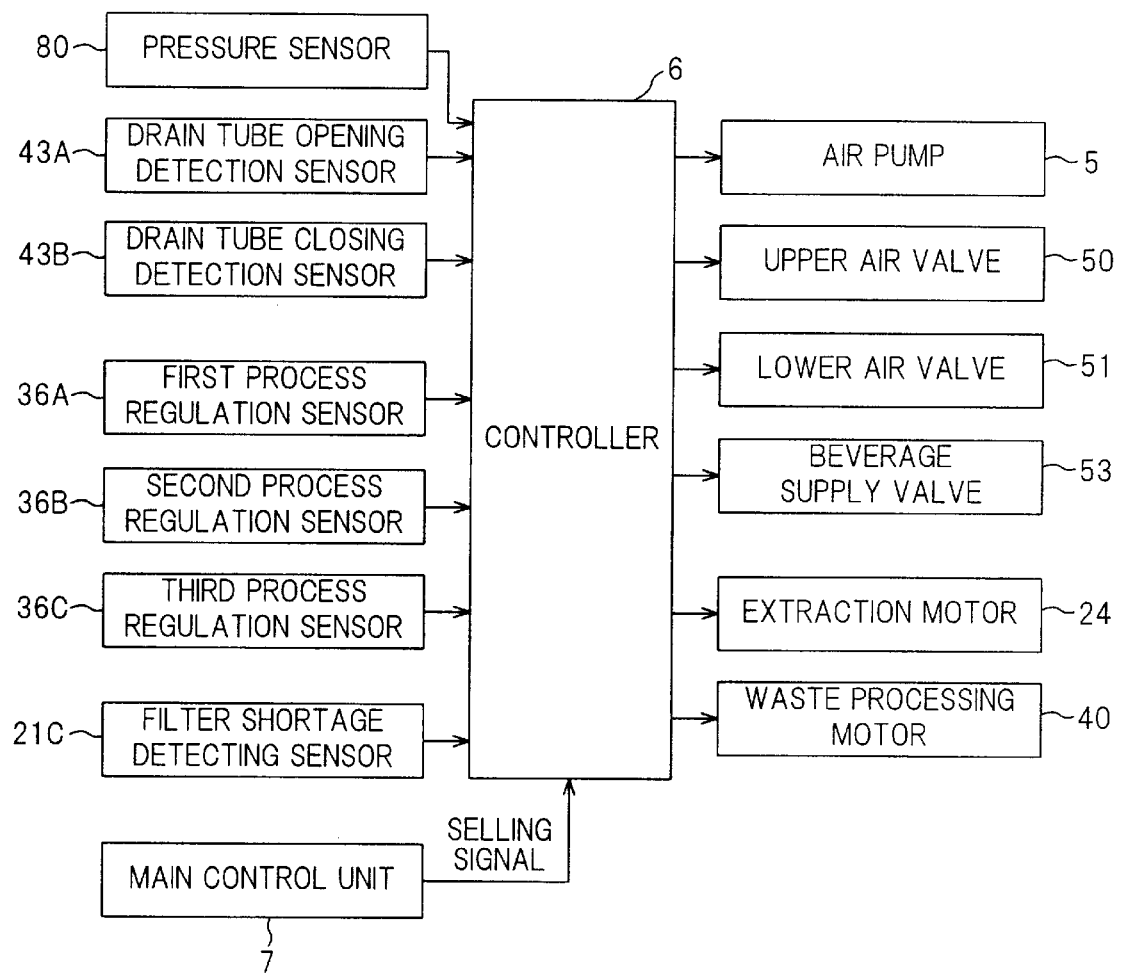
FIG. 35 is a block diagram of the control system in the sixth preferred embodiment of the invention.

FIG. 35 is a block diagram of the beverage extraction apparatus in the sixth preferred embodiment. With control unit 6 of the beverage extraction apparatus, there are connected drain tube opening detection sensor 43A, drain tube closing detection sensor 43B, first, second and third process regulation sensor 36A, 36B and 36C, respectively, filter shortage sensor 21C, air pump 5, upper air valve 50, lower air valve 51, beverage supply valve 53, pressure sensor 80. extraction motor 24 and waste processing motor 40, and further main control unit 7 for control of serving the beverage. when the serving signal is outputted from main control unit 7, control unit 6 controls the on/off of extraction-motor 24, waste processing motor 40 and air pump 5 to execute a series of beverage extraction process, including agitation process, extraction process and waste disposal process as shown in FIGS. 12A to 12D, FIGS. 13A to 13D, FIGS. 14A to 14D, FIG. 18 and FIG. 19. Pressure sensor 80 outputs a detection signal according to the pressure in extraction chamber 20d during the filtration to control unit 6.

Figure 36A:
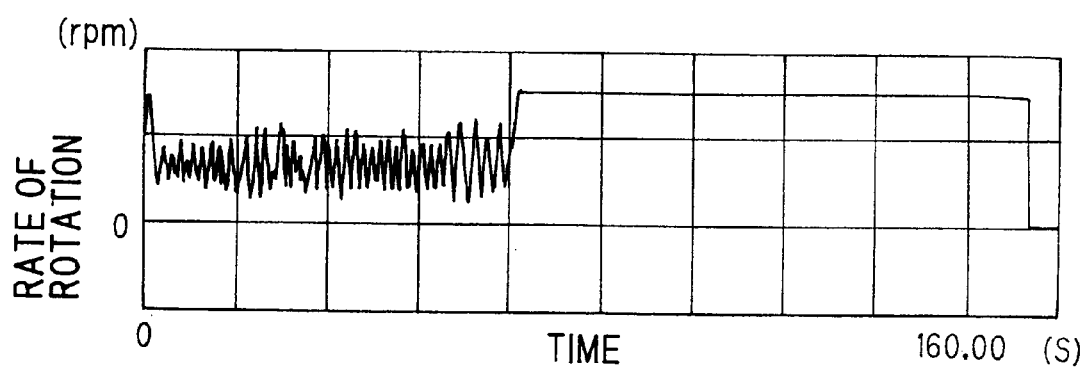
FIG. 36A is an explanatory view showing the state of driving of the air pump in the sixth preferred embodiment of the invention.

FIG. 36A shows air pump 5 in the driving state. The pressure within extraction chamber 20d during the filtration is controlled to a preset pressure by the on/off of air pump 5 according to a control signal outputted from control unit 6. If the detection signal detecting the pressure within extraction chamber 20d outputted from pressure sensor 80 exceeds the upper limit of the preset range. driving of air pump 5 is stopped. If the detection signal reaches the lower limit of the preset range, air pump 5 resumes driving.

Figure 36B:
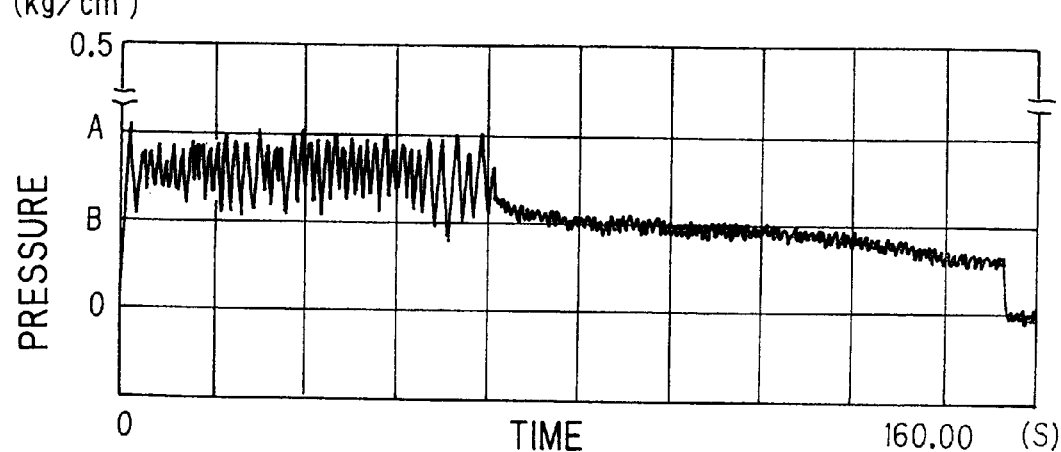
FIG. 36B is an explanatory view showing the pressure change according to the driving of the air pump in the sixth preferred embodiment of the invention.
Figure 37:
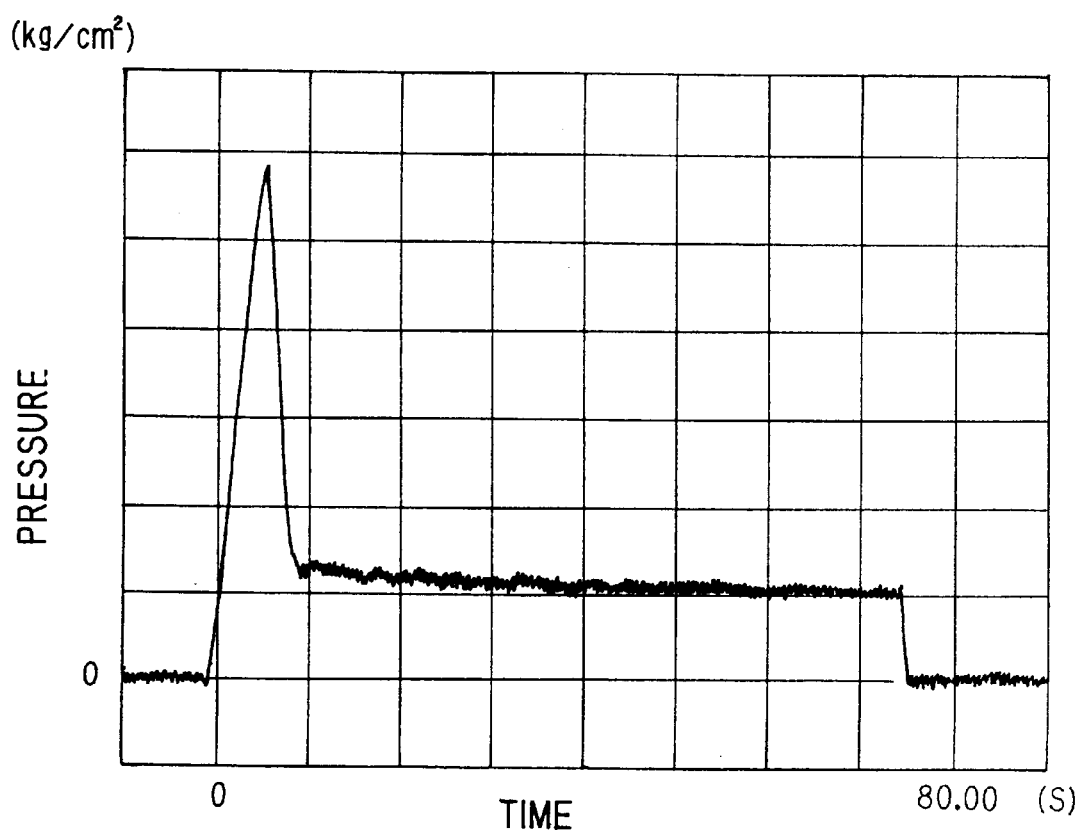
FIG. 37 is an explanatory view showing the pressure change in the cylinder without driving control of the air pump.
Figure 38:
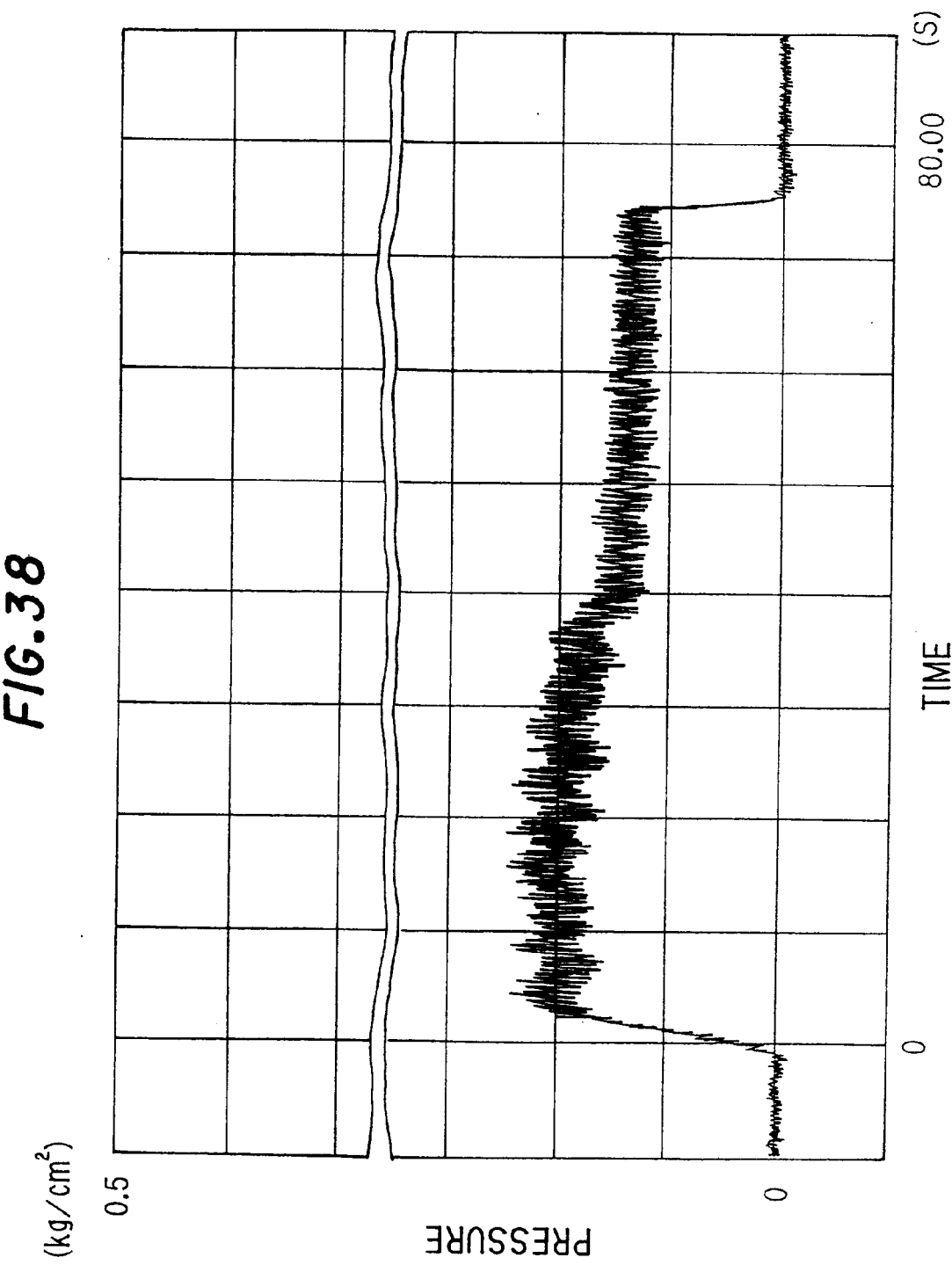
FIG. 38 is an explanatory view showing the pressure change in the extraction process of the beverage under driving control of the air pump.

FIG. 36B shows the change of the pressure within extraction chamber 20d during the filtration by driving control of air pump 5 described above, in batch extraction. The pressure within extraction chamber 20d is controlled in the range from upper limit A and lower limit B according to on/off of air pump 5, thereby more stable filtration is permitted under very low pressure, compared to the pressure change without pressure control as shown in FIG. 37. The change in pressure from the start to the finish of the filtration is shown in FIG. 38. The filtered extract is supplied to the serving cup portion by way of beverage supply tube 22C. The compressed air supplied to extraction chamber 20dd increases the pressure therein so as to press down the mixture toward paper filter 21, whereby the mixture is separated to the beverage and the waste in a short period, the efficiency of filtration being improved.

In the beverage extraction apparatus described above, the pressure within extraction chamber 20d is detected during the filtration of the mixture of powdered rawmaterial and hot water, and controlled by on/off of air pump 5 according to the pressure detection signal, whereby useless elongation of the time for filtration is avoided and extraction of bitter, astringency and other impure tastes by squeezing the mixture during filtration is prevented.

FIG. 39 shows the constitution of beverage. extraction apparatus in the seventh preferred embodiment of the invention. Branch 59b is provided upstream of branch 59a which leads to pressure sensor 80, and pressure releasing valve 81 to be opened and closed according to the pressure detection signal from pressure signal 80 is disposed in communication with branch 59b. In this arrangement, pressure releasing valve 81 is opened to release the pressure to the atmosphere when the pressure within extraction chamber 20d during the filtration exceeds the upper limit of a preset range, while pressure releasing valve 81 is closed when the pressure reaches the lower limit of the preset range, according to the pressure detection signal. Taking advantage of the arrangement, on/off control of the motor for air compression is not needed, thereby the cost can be reduced.

The sixth and seventh preferred embodiments are explained with respect to the pressure control during filtration in batch extraction process, but similar pressure control is applicable to the pressure control in timely extraction process by changing the preset pressure. In addition, the preset range of pressure may be varied in accordance with consumer's preference by recording in a memory the preset range of pressure according to the condition of extraction of powdered raw material and hot water.

Also in cases where a raw material other than coffee, such as black tea, green tea etc., is used, extraction of impurities from the mixture is prevented without useless elongation of the time for extraction by the control described above.

As described in the foregoing, the beverage extraction apparatus according to the invention is capable of extraction of a beverage having improved quality because it is free from extraction of bitter, astringency and other impure tastes. Accordingly, the invented apparatus is adapted to a beverage extraction apparatus in a vendor.

Although the invention has been described with respect to the specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. A beverage extraction apparatus for extracting a beverage by filtering a mixture of a raw material for said beverage comprising:

an extraction chamber;

a filter for said filtering;

an air pump for supplying compressed air into said extraction chamber; and means for adjusting said pressure within said extraction chamber during said filtering to a pressure smaller than a predetermined pressure.

2. The beverage extraction apparatus as defined in claim 1, wherein:

said pressure adjusting means comprises;

means for detecting pressure within said extraction chamber during said filtering and outputting a pressure signal; and means for controlling a duty ratio of on and off of said air pump according to said pressure signal.

3. The beverage extraction apparatus as defined in claim 1, wherein:

said pressure adjusting means comprises;

a pressure releasing valve for reducing said pressure within said extraction chamber during said filtering; and means for controlling said pressure by operating said pressure releasing valve when said pressure exceeds a predetermined pressure according to said pressure signal.

4. The beverage extraction apparatus as defined in claim 1, wherein:

said pressure adjusting means comprises a memory for storing said predetermined pressure which is determined by concentration of beverage to be extracted.

5. The beverage extraction apparatus as defined in claim 1, wherein said beverage is selected from the group consisting of coffee, black tea, green tea and hot water.

* * * * *